(12) United States Patent
Castro

(10) Patent No.: US 12,437,810 B2
(45) Date of Patent: Oct. 7, 2025

(54) MEMORY DEVICE PERFORMING MULTIPLICATION USING LOGICAL STATES OF MEMORY CELLS

(71) Applicant: Micron Technology, Inc., Boise, ID (US)

(72) Inventor: Hernan Castro, Shingle Springs, CA (US)

(73) Assignee: Micron Technology, Inc., Boise, ID (US)

( * ) Notice: Subject to any disclaimer, the term of this patent is extended or adjusted under 35 U.S.C. 154(b) by 77 days.

(21) Appl. No.: 18/494,652

(22) Filed: Oct. 25, 2023

(65) Prior Publication Data

US 2024/0177772 A1    May 30, 2024

Related U.S. Application Data

(60) Provisional application No. 63/385,242, filed on Nov. 29, 2022.

(51) Int. Cl.
| | | |
|---|---|---|
| *G11C 7/00* | (2006.01) | |
| *G06F 7/544* | (2006.01) | |
| *G11C 11/00* | (2006.01) | |
| *G11C 13/00* | (2006.01) | |
| *G11C 19/36* | (2006.01) | |

(52) U.S. Cl.
CPC ........ *G11C 13/0069* (2013.01); *G06F 7/5443* (2013.01); *G11C 19/36* (2013.01)

(58) Field of Classification Search
CPC ..... G11C 13/0069; G11C 19/36; G11C 11/54; G11C 13/004; G11C 5/06; G11C 16/0483; G06F 7/5443; G06F 2207/4814; G06F 2207/4824; G06T 1/60
See application file for complete search history.

(56) References Cited

U.S. PATENT DOCUMENTS

| | | |
|---|---|---|
| 6,144,589 A | 11/2000 | Micheloni et al. |
| 10,665,313 B1 | 5/2020 | Lu et al. |
| 10,887,396 B2 | 1/2021 | Manweiler et al. |
| 11,526,739 B2 | 12/2022 | Seo et al. |
| 11,544,532 B2 | 1/2023 | Puscas et al. |
| 12,045,718 B2 | 7/2024 | Culurciello et al. |

(Continued)

OTHER PUBLICATIONS

Memory Device Having Bonded Integrated Circuit Dies Used for Multiplication, U.S. Appl. No. 18/423,151, filed Jan. 25, 2024 Confirmation: 5476 Status Date: Feb. 27, 2024 Inventor: Hernan Castro Status: Docketed New Case—Ready for Examination.

(Continued)

*Primary Examiner* — Hien N Nguyen
(74) *Attorney, Agent, or Firm* — Greenberg Traurig

(57) ABSTRACT

Systems, methods, and apparatus related to memory devices that perform multiplication using logical states of memory cells. In one approach, a memory cell array has memory cells programmed to store weights for performing the multiplication. Voltages are applied to the memory cells. Each voltage represents one or more input bits to be multiplied by one of the weights. Output currents from the memory cells are accumulated in a common bitline. A sum of the output currents is digitized to provide a digital result. The digital results from several bitlines can be shifted based on bit significance and added to provide a final accumulation result from the multiplication.

20 Claims, 11 Drawing Sheets

(56) References Cited

U.S. PATENT DOCUMENTS

| | | | |
|---|---|---|---|
| 2003/0081134 A1* | 5/2003 | Luo | H04N 25/7795 |
| | | | 348/E3.018 |
| 2019/0171936 A1 | 6/2019 | Karras et al. | |
| 2019/0317803 A1 | 10/2019 | Maheshwari et al. | |
| 2020/0364625 A1 | 11/2020 | Baker et al. | |
| 2021/0020255 A1* | 1/2021 | Tran | G11C 16/0425 |
| 2021/0181728 A1 | 6/2021 | Yamaguchi et al. | |
| 2022/0188632 A1 | 6/2022 | Culurciello et al. | |
| 2023/0333816 A1* | 10/2023 | Hanzawa | G06F 7/5443 |
| 2024/0089632 A1 | 3/2024 | Kale | |
| 2024/0303037 A1 | 9/2024 | Castro | |
| 2024/0303038 A1 | 9/2024 | Castro | |
| 2024/0303039 A1 | 9/2024 | Castro | |
| 2024/0303296 A1 | 9/2024 | Castro | |
| 2024/0304252 A1 | 9/2024 | Castro | |
| 2024/0304253 A1 | 9/2024 | Castro | |
| 2024/0304254 A1 | 9/2024 | Castro | |
| 2024/0304255 A1 | 9/2024 | Castro | |

OTHER PUBLICATIONS

Memory Device Performing Signed Multiplication using Logical States of Memory Cells, U.S. Appl. No. 18/423,161, filed Jan. 25, 2024 Confirmation: 4122 Status Date: Mar. 2, 2024 Inventor: Hernan Castro Status: Docketed New Case—Ready for Examination.

Memory Device Performing Signed Multiplication using Sets of Two Memory Cells, U.S. Appl. No. 18/423,163, filed Jan. 25, 2024 Confirmation: 5360 Status Date: Feb. 27, 2024 Inventor: Hernan Castro Status: Docketed New Case—Ready for Examination.

Memory Device Performing Signed Multiplication using Sets of Four Memory Cells, U.S. Appl. No. 18/423,168, filed Jan. 25, 2024 Confirmation: 8688 Status Date: Feb. 22, 2024 Inventor: Hernan Castro Status: Docketed New Case—Ready for Examination.

Memory Device for Summation of Outputs of Signed Multiplications, U.S. Appl. No. 18/423,174, filed Jan. 25, 2024 Confirmation: 2133 Status Date: Mar. 2, 2024 Inventor: Hernan Castro Status: Docketed New Case—Ready for Examination.

Memory Device for Signed Multi-Bit to Multi-Bit Multiplications, U.S. Appl. No. 18/423,178, filed Jan. 25, 2024 Confirmation: 8504 Status Date: Mar. 2, 2024 Inventor: Hernan Castro Status: Docketed New Case—Ready for Examination.

Memory Device for Multiplication using Memory Cells with Different Thresholds based on Bit Significance, U.S. Appl. No. 18/423,181, filed Jan. 25, 2024 Confirmation: 2410 Status Date: Mar. 2, 2024 Inventor: Hernan Castro Status: Docketed New Case—Ready for Examination.

Memory Device for Multiplication using Memory Cells Having Different Bias Levels based on Bit Significance, U.S. Appl. No. 18/423,186, filed Jan. 25, 2024 Confirmation: 7652 Status Date: Feb. 22, 2024 Inventor: Hernan Castro Status: Docketed New Case—Ready for Examination.

Evolutionary Imitation Learning, U.S. Appl. No. 17/124,389, filed Dec. 16, 2020 Confirmation: 6840 Status Date: Apr. 2, 2024 Inventors: Eugenio Culurciello, et al. Status: Notice of Allowance Mailed—Application Received in Office of Publications.

Evolutionary Algorithm, Wikipedia, printed on Nov. 17, 2020.

Floreano, Dario, et al. "Evolution of Adaptive Behaviour in Robots by Means of Darwinian Selection." PloS Biology, vol. 8, Issue 1, Jan. 2010.

International Search Report and Written Opinion, PCT/US2021/062593, mailed on Apr. 4, 2022.

Lillicrap, Timothy P., et al. "Continuous control with deep reinforcement learning." arXiv preprint arXiv:1509.02971 (2015).

Robert Dadashi, "Imitation Learning in the Low-Data Regime", Google AI Blog, https://ai.googleblog.com/2020/09/imitation-learning-in-low-data-regime.html, Sep. 15, 2020.

Memory Device Performing Signed Multiplication using Logical States of Memory Cells, U.S. Appl. No. 18/423,161, filed Jan. 25, 2024 Confirmation: 4122 Status Date: Jan. 25, 2024 Inventor: Hernan Castro Status: Application Undergoing Preexam Processing.

Memory Device Performing Signed Multiplication using Sets of Two Memory Cells, U.S. Appl. No. 18/423,163, filed Jan. 25, 2024 Confirmation: 5360 Status Date: Jan. 25, 2024 Inventor: Hernan Castro Status: Application Undergoing Preexam Processing.

Memory Device Performing Signed Multiplication using Sets of Four Memory Cells, U.S. Appl. No. 18/423,168, filed Jan. 25, 2024 Confirmation: 8688 Status Date: Jan. 25, 2024 Inventor: Hernan Castro Status: Application Undergoing Preexam Processing.

Memory Device for Summation of Outputs of Signed Multiplications, U.S. Appl. No. 18/423,174, filed Jan. 25, 2024 Confirmation: 2133 Status Date: Jan. 25, 2024 Inventor: Hernan Castro Status: Application Undergoing Preexam Processing.

Memory Device for Signed Multi-Bit to Multi-Bit Multiplications, U.S. Appl. No. 18/423,178, filed Jan. 25, 2024 Confirmation: 8504 Status Date: Jan. 25, 2024 Inventor: Hernan Castro Status: Application Undergoing Preexam Processing.

Memory Device for Multiplication using Memory Cells with Different Thresholds based on Bit Significance, U.S. Appl. No. 18/423,181, filed Jan. 25, 2024 Confirmation: 2410 Status Date: Jan. 25, 2024 Inventor: Hernan Castro Status: Application Undergoing Preexam Processing.

Memory Device for Multiplication using Memory Cells Having Different Bias Levels based on Bit Significance, U.S. Appl. No. 18/423,186, filed Jan. 25, 2024 Confirmation: 7652 Status Date: Jan. 25, 2024 Inventor: Hernan Castro Status: Application Undergoing Preexam Processing.

Evolutionary Imitation Learning, U.S. Appl. No. 17/124,389, filed Dec. 16, 2020 Confirmation: 6840 Status Date: Aug. 21, 2021 Inventors: Eugenio Culurciello, et al. Status: Docketed New Case—Ready for Examination.

Aug. 21, 2021, Inventors: Eugenio Culurciello, et al. Docketed New Case—Ready for Examination.

Ortega, Juan, et al., "Imitating Human Playing Styles in Super Mario Bros." Entertainment Computing, Elsevier, 2013.

Togelius, Julian, et al., "Towards Automatic Personalized Content Creation for Racing Games." IEEE Symposium Cig, IEEE, 2007.

Kim, Min-Kyu, et al., "Emerging Materials for Neuromorphic Devices and Systems." ScienceDirect, Dec. 18, 2020.

\* cited by examiner

MEMORY DEVICE PERFORMING MULTIPLICATION USING LOGICAL STATES OF MEMORY CELLS

RELATED APPLICATIONS

The present application claims priority to Prov. U.S. Pat. App. Ser. No. 63/385,242 filed Nov. 29, 2022, the entire disclosure of which application is hereby incorporated herein by reference.

TECHNICAL FIELD

At least some embodiments disclosed herein relate to memory devices in general and more particularly, but not limited to, memory devices performing multiplication using logical states of memory cells.

BACKGROUND

Image and other sensors can generate large amounts of data. It is inefficient to transmit certain types of data from the sensors to general-purpose microprocessors (e.g., central processing units (CPU)) for processing in some applications. For example, it is inefficient to transmit image data from image sensors to microprocessors for image segmentation, object recognition, feature extraction, etc.

Some image processing can include intensive computations involving multiplications of columns or matrices of elements for accumulation. Some specialized circuits have been developed for the acceleration of multiplication and accumulation operations. For example, a multiplier-accumulator (MAC unit) can be implemented using a set of parallel computing logic circuits to achieve a computation performance higher than general-purpose microprocessors.

BRIEF DESCRIPTION OF THE DRAWINGS

The embodiments are illustrated by way of example and not limitation in the figures of the accompanying drawings in which references indicate similar elements.

DETAILED DESCRIPTION

Figure 1:
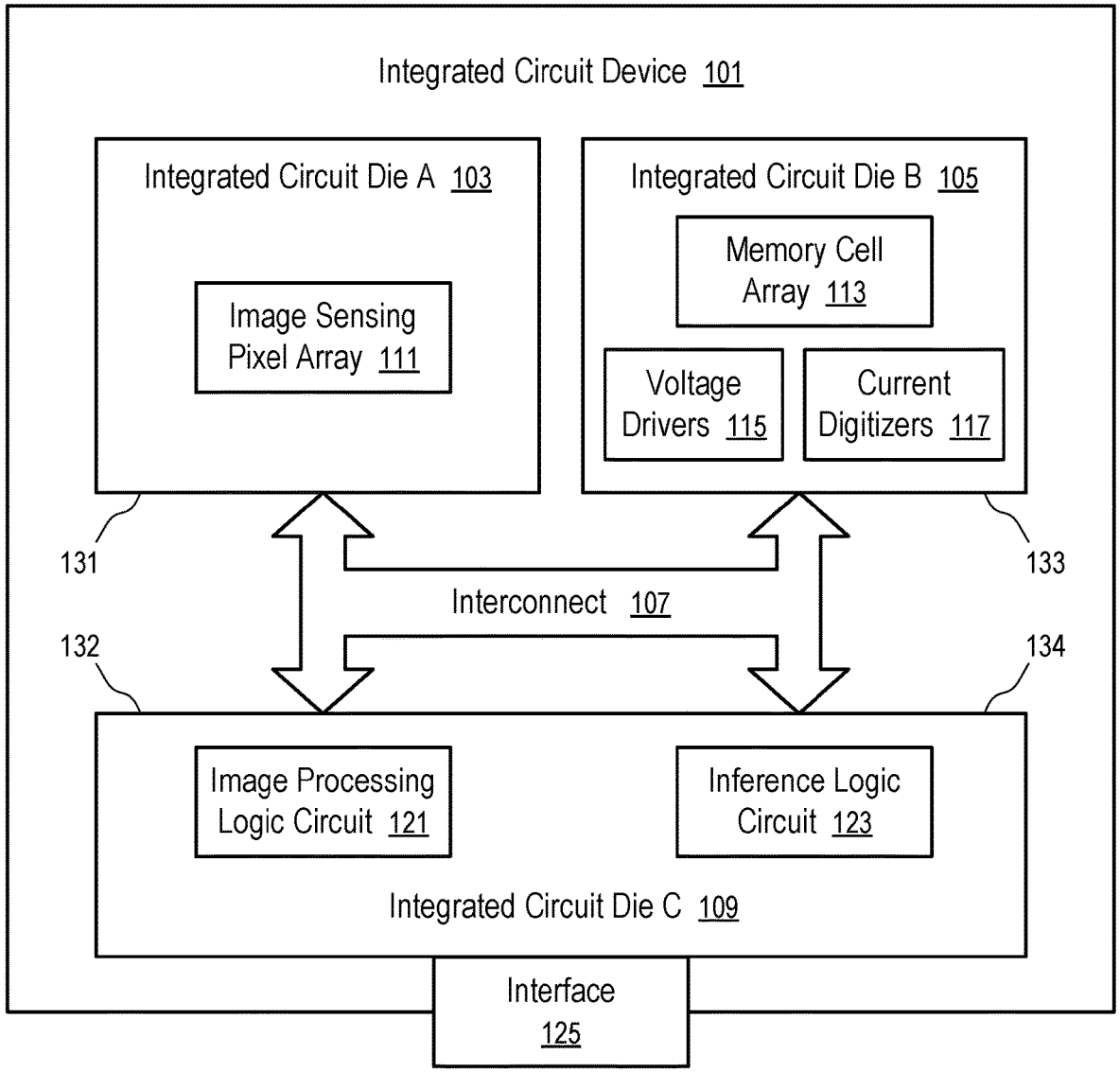
FIG. 1 shows an integrated circuit device having an image sensing pixel array, a memory cell array, and circuits to perform inference computations according to one embodiment.

The following disclosure describes various embodiments for memory devices performing multiplication using logical states of memory cells. The memory device may, for example, store data used by a host device (e.g., a computing device of an autonomous vehicle, or another computing device that accesses data stored in the memory device). In one example, the memory device is a solid-state drive mounted in an electric vehicle.

Artificial intelligence (AI) accelerated applications are growing rapidly. Deep learning technologies have been playing a critical role in this emergence and achieved success in a variety of applications such as image classification, object detection, speech recognition, natural language processing, recommender systems, automatic generation, and robotics etc. Many domain-specific deep learning accelerators (DLA) (e.g., GPU, TPU and embedded NPU), have been introduced to provide the required efficient implementations of deep neural networks (DNN) from cloud to edge. However, the limited memory bandwidth is still a critical challenge due to frequent data movement back and forth between compute units and memory in deep learning, especially for energy constrained systems and applications (e.g., edge AIs).

Conventional Von-Neumann computer architecture has developed with processor chips specialized for serial processing and DRAMs optimized for high density memory. The interface between these two devices is a major bottleneck that introduces latency and bandwidth limitations and adds a considerable overhead in power consumption. With the growing demand of higher accuracy and higher speed for AI applications, larger DNN models are developed and implemented with huge amounts of weights and activations. The resulting bottlenecks of memory bandwidth and power consumption on inter-chip data movement are significant technical problems.

To address these and other technical problems, a memory device integrates memory and processing. In one example, memory and inference computation processing are integrated in the same integrated circuit device. In some embodiments, the memory device is an integrated circuit device having an image sensing pixel array, a memory cell array, and one or more circuits to use the memory cell array to perform inference computation on image data from image sensors. In some embodiments, the memory device includes or is used with other types of sensors (e.g., LIDAR, radar, sound).

Existing methods of matrix vector multiplication use digital logic gates. Digital logic implementations are more complex, consume more silicon area, and dissipate more power as compared to various embodiments described below. These embodiments effectively reduce the multiplication to a memory access function which can be parallelized in an array. The accumulation function is carried out by wires that connect these memory elements, which can also be parallelized in an array. By combining these two features in an array, matrix vector multiplication can be performed more efficiently than methods using digital logic gates.

In one embodiment, an image sensor is configured with an analog capability to support inference computations by using matrix vector multiplication, such as computations of an artificial neural network. The image sensor can be implemented as an integrated circuit device having an image sensor chip and a memory chip. The memory chip can have a 3D memory array configured to support multiplication and accumulation operations. The integrated circuit device includes one or more logic circuits configured to process images from the image sensor chip, and to operate the memory cells in the memory chip to perform multiplications and accumulation operations.

The memory chip can have multiple layers of memory cells. Each memory cell can be programmed to store a bit of a binary representation of an integer weight. Each input line can be applied a voltage according to a bit of an integer. Columns of memory cells can be used to store bits of a weight matrix; and a set of input lines can be used to control voltage drivers to apply read voltages on rows of memory cells according to bits of an input vector.

The threshold voltage or state of a memory cell used for multiplication and accumulation operations can be programmed such that the current going through the memory cell subjected to a predetermined read voltage is either a predetermined amount representing a value of one stored in the memory cell, or negligible to represent a value of zero stored in the memory cell. When the predetermined read voltage is not applied, the current going through the memory cell is negligible regardless of the value stored in the memory cell. As a result of the configuration, the current going through the memory cell corresponds to the result of a 1-bit weight, as stored in the memory cell, multiplied by a 1-bit input, corresponding to the presence or the absence of the predetermined read voltage driven by a voltage driver controlled by the 1-bit input.

Output currents of the memory cells, representing the results of a column of 1-bit weights stored in the memory cells and multiplied by a column of 1-bit inputs respectively, are connected to a common line for summation. The summed current in the common line is a multiple of the predetermined amount; and the multiples can be digitized and determined using an analog to digital converter or other digitizer. Such results of 1-bit to 1-bit multiplications and accumulations can be performed for different significant bits of weights and different significant bits of inputs. The results for different significant bits can be shifted to apply the weights of the respective significant bits for summation to obtain the results of multiplications of multi-bit weights and multi-bit inputs with accumulation, as further discussed below.

Using the capability of performing multiplication and accumulation operations implemented via memory cell arrays, a logic circuit can be configured to perform inference computations, such as the computation of an artificial neural network.

Various embodiments of memory devices performing multiplication using logical states of memory cells are described below. A memory device typically has memory cells configured in an array, with each memory cell programmed, for example, to allow an amount of current to go through when a voltage is applied in a predetermined voltage region to represent a first logic state (e.g., a first value stored in the memory cell), or a negligible amount of current to represent a second logic state (e.g., a second value stored the memory cell).

The memory device performs computations based on applying voltages in a digital fashion, in the form of whether or not to apply an input voltage to generate currents for summation over a line (e.g., a bitline of a memory array). The total current on the line will be the multiple of the amount of current allowed for cells programmed at the first value. In one example, an analog-to-digital converter is used to convert the current to a digital result of a sum of bit-by-bit multiplications. Various implementations of performing bit-by-bit multiplications and extending these to multiplications involving multiple bits are described below.

The memory cells in the array may generally be of various types. Examples include NAND or NOR flash memory cells and phase-change memory (PCM) cells. In one example, the PCM cells are chalcogenide memory cells. In one example, floating gate or charge trap memory devices in NAND and NOR memory configurations are used.

NAND flash memory cells and chalcogenide memory cells have different current characteristics near their threshold voltages. The chalcogenide memory cells have a snap-back behavior, and a cell's voltage-current (V-I) curve is not continuous across the threshold voltage. In contrast, NAND flash memory cells exhibit a continuous behavior, but a cell's current typically increases rapidly near its threshold voltage region.

In various embodiments using chalcogenide memory cells, multiplications and other processing is performed by operating the chalcogenide memory cells in a sub-threshold region. This is to avoid thresholding or snapping of any memory cell, which typically would prevent proper multiplication (e.g., due to large undesired output currents associated with snapping).

In one embodiment, a memory device (e.g., integrated circuit device) includes a memory cell array having memory cells. Each memory cell is programmable to store a respective weight for performing a multiplication. The integrated circuit device also includes voltage drivers configured to apply input voltages to the memory cells for performing the multiplication. The input voltages represent an input to be multiplied by the respective weight for each memory cell, and the voltages are applied so that operation of the memory cells remains in a sub-threshold mode during the multiplication.

The integrated circuit device has a bitline (or other common line) coupled to the memory cells. The bitline is configured to sum output currents from each of the memory cells that result from applying the input voltages. The integrated circuit device has a digitizer configured to generate a result for the multiplication based on the summed output currents.

In one embodiment, a memory device implements unsigned 1-bit to 1-bit multiplication using chalcogenide or other types of memory cells (e.g., NAND cells). Each memory cell can be programmed to a "1-state" such that a predetermined amount of current can go through the memory cell when a voltage V is applied across the memory cell (e.g., across two terminals of a resistive memory cell). Alternatively, the memory cell can be programmed to a "0-state" such that only a negligible amount of current can go through the memory cell when the same voltage V is applied.

To avoid operability issues with snap-back behavior, when using chalcogenide memory cells, it is desired to apply the voltage V only in the sub-threshold region of the memory cell. In one example, the applied voltage is lower than but close to the threshold/snap voltage of each memory cell that is programmed to the "1-state". In general, the memory cells can be operated in a sub-threshold mode for any types of cells as may be desired (e.g., other phase-change memory cells or NAND cells). However, sub-threshold mode operation is not required for all embodiments.

Thus, the memory cells can be programmed to the "1-state" or the "0-state" to represent a stored weight of "1" or "0" respectively.

An input voltage of V can be used to represent an input of "1"; and an input voltage of 0 can be used to represent an input of "0". Alternatively, another voltage can be used to represent an input of "0" when the voltage is lower than V but only causes a negligible amount of current to go through the memory cell (regardless of the programmed state of the memory cell).

When a voltage configured to be representative of an input of either 1 or 0 as described above is applied on the memory cell, programmed to either the "1-State" or "0-State" to represent a weight of 1 or 0 as discussed above, the amount of current going through the memory cell is either the predetermined amount (representative of an output of "1"), or a negligible amount (representative of an output of "0"). Further, the input, weight and output relations satisfy the multiplication of a 1-bit input by a 1-bit weight to generate a 1-bit output in all possible variations of input and weight.

Thus, a memory cell is used to perform unsigned 1-bit to multi-bit multiplication via being programed to store a 1-bit weight (e.g., in a way as discussed above), applying an input voltage to represent a 1-bit input (e.g., in a way as discussed above), and to determine a 1-bit output from sensing whether the current going through the memory cell (the output current from the memory cell) is the predetermined amount.

Summation of results represented by output currents from memory cells can be implemented via connecting the currents to a common line (e.g., a bitline). The summation of results can be digitized to provide a digital output. In one example, an analog-to-digital converter is used to measure the sum as the multiple of the predetermined amount of current and to provide a digital output.

In one embodiment, a memory device implements unsigned 1-bit to multi-bit multiplication. A multi-bit weight can be implemented via multiple memory cells. Each of the memory cells is configured to store one of the bits of the multi-bit weight, as just described above.

A voltage represented by a 1-bit input can be applied to the multiple memory cells separately to obtain results of unsigned 1-bit to 1-bit multiplication as described above.

Each memory cell has a position corresponding to its stored bit in the binary representation of the multi-bit weight. Its digitized output (e.g., from the summing of output currents from memory cells on a common bitline) can be shifted left according to its position in the binary representation to obtain a shifted result. For example, the digitized output of the memory cell storing the least significant bit of the multi-bit weight is shifted by 0 bit; the digitized output of the memory cell storing the second least significant bit of the multi-bit weight is shifted by 1 bit; the digitized output of the memory cell storing the third least significant bit of the multi-bit weight is shifted by 2 bit; etc. The shifted results can be summed to obtain the result of the 1-bit input multiplied by the multi-bit weight stored in the multiple memory cells.

Summation of results represented by output currents from sets of memory cells, each set representing a separate multi-bit weight, can be summed bitwise, via currents connected in common lines, for the different bit positions in multi-bit weights. For example, the currents from memory cells storing the least significant bit are connected to a first common line to form the summed output of results derived from the least significant bits; the currents from memory cells storing the second least significant bit are connected to a second common line to form the summed output of results derived from the second least significant bits; the currents from memory cells storing the third least significant bit are connected to a third common line to form the summed output of results derived from the third least significant bits; etc. The summed outputs can be converted to a digital form, and then shifted for summation in a digital form. Alternatively, the respective currents may be scaled prior to digitization.

As mentioned above, the memory cells can be operated in a sub-threshold mode for any types of cells as may be desired (e.g., chalcogenide or other phase-change memory cells, or NAND cells). Sub-threshold mode operation is not required for all embodiments.

In one embodiment, a memory device implements time-sliced unsigned multi-bit to multi-bit multiplication. An input represented by a binary number having a predetermined number of bits (e.g., 4 bits) can be applied one bit at a time through the same predetermined number of clock cycles (e.g., applied at time instances T, T1, T2, etc. as in FIG. 4). Each cycle produces an output as described above for unsigned 1-bit to multi-bit multiplication.

The result of the unsigned 1-bit to multi-bit multiplication (e.g., as discussed above) obtained for each clock cycle can be shifted left according to the position of the bit of the input applied in the clock cycle. For example, the result of the clock cycle that applies the least significant bit of the input is not shifted; the result for the second least significant bit is shifted left by 1 bit; the result for the third least significant bit is shifted left by 2 bits; etc. The shifted results from the clock cycles are summed in a digital form.

As mentioned above, the memory cells can be operated in a sub-threshold mode for any types of cells as may be desired (e.g., chalcogenide or other phase-change memory cells, or NAND cells). Sub-threshold mode operation is not required for all embodiments.

In one embodiment, a memory device uses pulse width modulation (PWM) for performing unsigned multi-bit to multi-bit multiplication. An input voltage pulse is applied to multiple memory cells to produce current output as described above. The width of the voltage pulse (e.g., a length of time such as 5 nanoseconds, 10 nanoseconds, or 15 nanoseconds) is proportional to the multi-bit input. In one embodiment, the input voltage pulse is a constant voltage.

The output current from each memory cell is integrated over time to obtain the input multiplied by the 1-bit weight stored in the respective memory cell. The results from each memory cell can be digitized as a multiple of a predetermined amount of current integrated over a unit of time, corresponding to the width of the voltage pulse for an input of "1". The digitized outputs are shifted according to their positions in the multi-bit weight for summation. The current integration over time can be implemented via charging a capacitor or by other methods. In one embodiment, the current integration is performed using any of various types of integrators.

As mentioned above, the memory cells can be operated in a sub-threshold mode for any types of cells as may be desired (e.g., chalcogenide or other phase-change memory cells, or NAND cells). Sub-threshold mode operation is not required for all embodiments.

FIG. 1 shows an integrated circuit device 101 having an image sensing pixel array 111, a memory cell array 113, and circuits to perform inference computations according to one embodiment. In FIG. 1, the integrated circuit device 101 has an integrated circuit die 109 having logic circuits 121 and 123, an integrated circuit die 103 having the image sensing pixel array 111, and an integrated circuit die 105 having a memory cell array 113.

In one example, the integrated circuit die 109 having logic circuits 121 and 123 is a logic chip; the integrated circuit die 103 having the image sensing pixel array 111 is an image sensor chip; and the integrated circuit die 105 having the memory cell array 113 is a memory chip.

Figure 2:
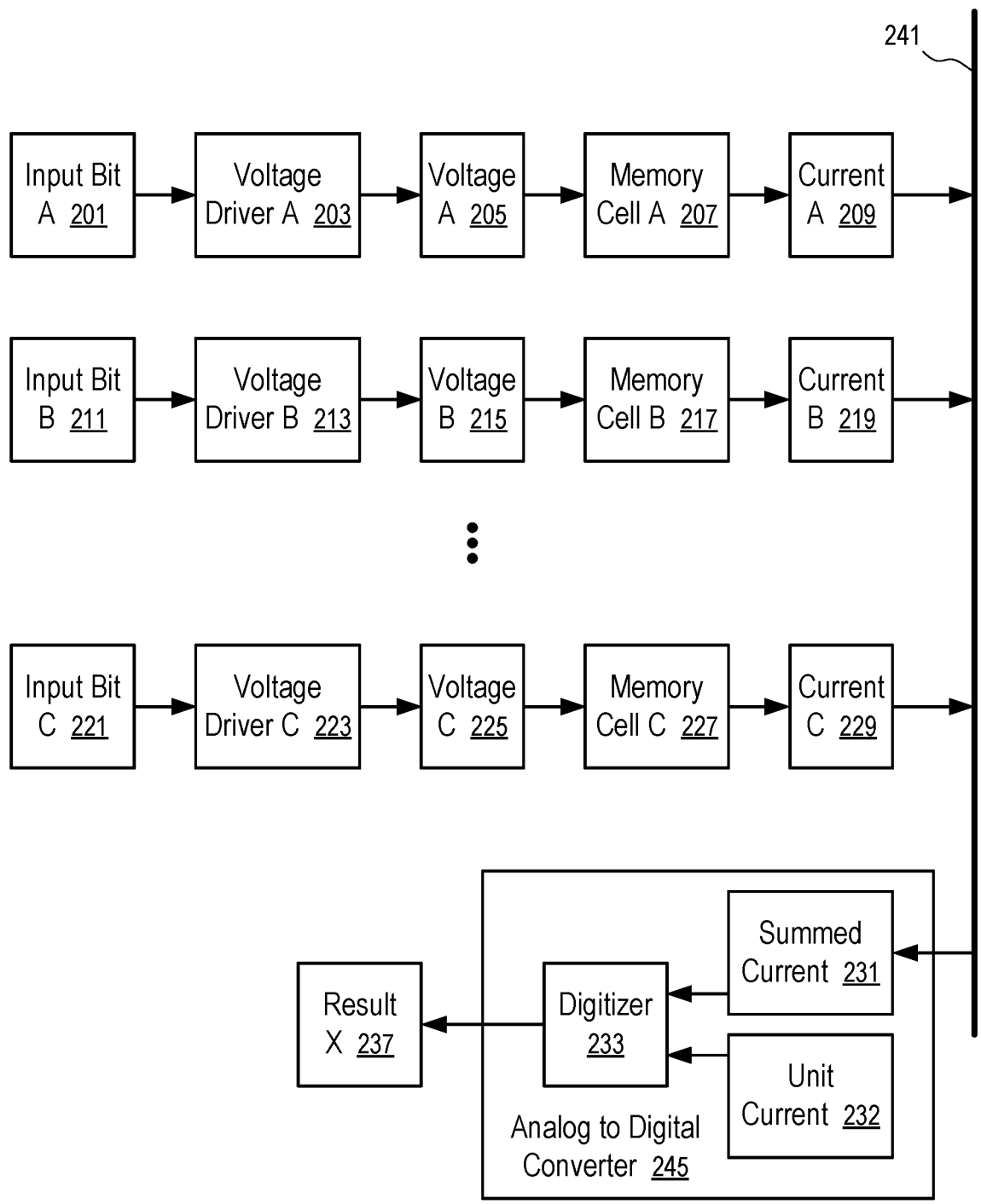
FIG. 2 shows the computation of a column of weight bits multiplied by a column of input bits to provide an accumulation result according to one embodiment.
Figure 3:
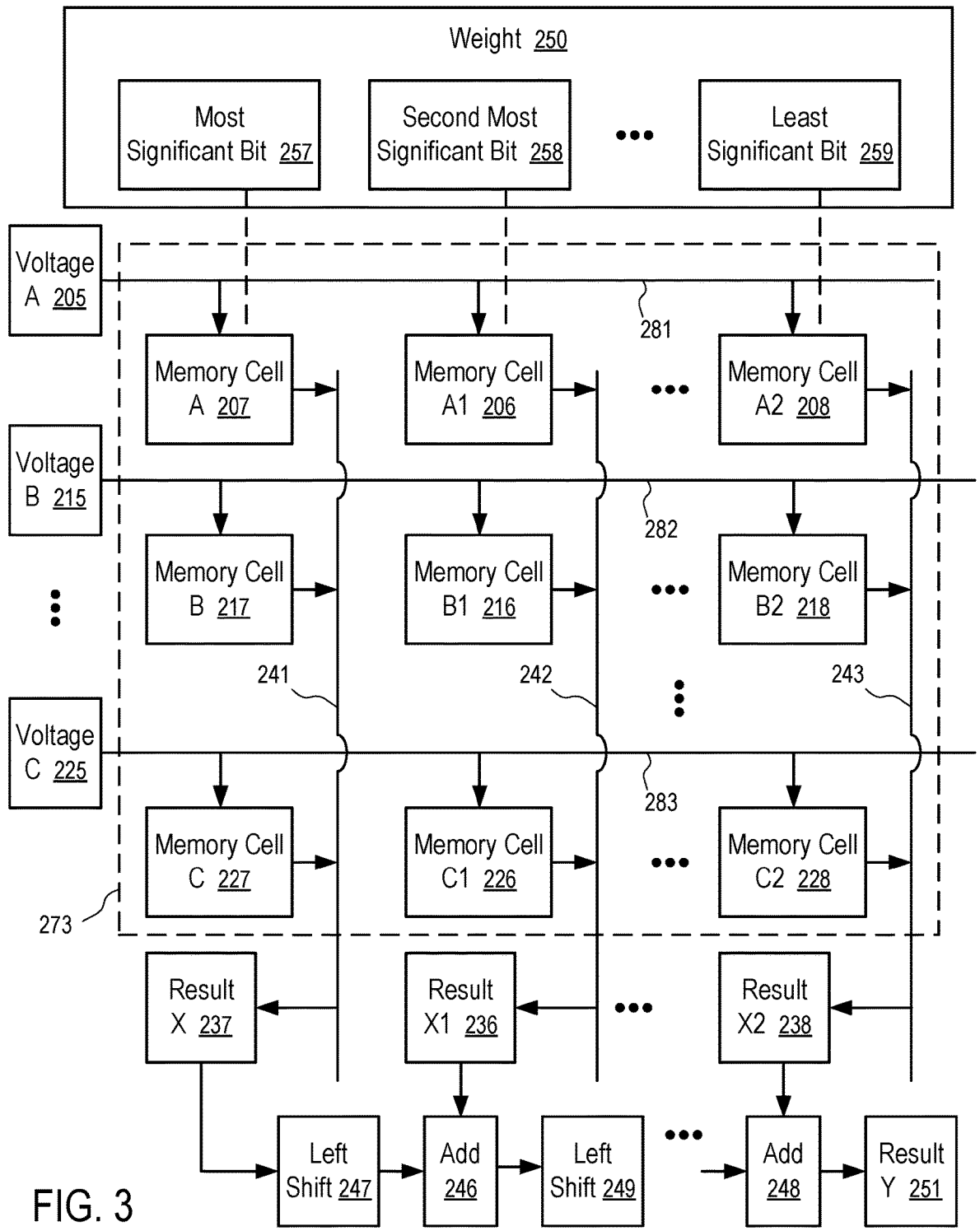
FIG. 3 shows the computation of a column of multi-bit weights multiplied by a column of input bits to provide an accumulation result according to one embodiment.

In FIG. 1, the integrated circuit die 105 having the memory cell array 113 further includes voltage drivers 115 and current digitizers 117. The memory cell array 113 is connected such that currents generated by the memory cells in response to voltages applied by the voltage drivers 115 are summed in the array 113 for columns of memory cells (e.g., as illustrated in FIG. 2 and FIG. 3); and the summed currents are digitized to generate the sum of bit-wise multiplications. The inference logic circuit 123 can be configured to instruct the voltage drivers 115 to apply read voltages according to a column of inputs, and perform shifts and summations to generate the results of a column or matrix of weights multiplied by the column of inputs with accumulation.

The inference logic circuit 123 can be further configured to perform inference computations according to weights stored in the memory cell array 113 (e.g., the computation of an artificial neural network) and inputs derived from the image data generated by the image sensing pixel array 111. Optionally, the inference logic circuit 123 can include a programmable processor that can execute a set of instructions to control the inference computation. Alternatively, the inference computation is configured for a particular artificial neural network with certain aspects adjustable via weights stored in the memory cell array 113. Optionally, the inference logic circuit 123 is implemented via an application-specific integrated circuit (ASIC), a field-programmable gate array (FPGA), or a core of a programmable microprocessor.

In FIG. 1, the integrated circuit die 105 having the memory cell array 113 has a bottom surface 133; and the integrated circuit die 109 having the inference logic circuit 123 has a portion of a top surface 134. The two surfaces 133 and 134 can be connected via bonding to provide a portion of an interconnect 107 between metal portions on the surfaces 133 and 134.

Similarly, the integrated circuit die 103 having the image sensing pixel array 111 has a bottom surface 131; and the integrated circuit die 109 having the inference logic circuit 123 has another portion of its top surface 132. The two surfaces 131 and 132 can be connected via bonding to provide a portion of the interconnect 107 between metal portions on the surfaces 131 and 132.

An image sensing pixel in the array 111 can include a light sensitive element configured to generate a signal responsive to intensity of light received in the element. For example, an image sensing pixel implemented using a complementary metal-oxide-semiconductor (CMOS) technique or a charge-coupled device (CCD) technique can be used.

In some implementations, the image processing logic circuit 121 is configured to pre-process an image from the image sensing pixel array 111 to provide a processed image as an input to the inference computation controlled by the inference logic circuit 123.

Optionally, the image processing logic circuit 121 can also use the multiplication and accumulation function provided via the memory cell array 113.

In some implementations, interconnect 107 includes wires for writing image data from the image sensing pixel array 111 to a portion of the memory cell array 113 for further processing by the image processing logic circuit 121 or the inference logic circuit 123, or for retrieval via an interface 125.

The inference logic circuit 123 can buffer the result of inference computations in a portion of the memory cell array 113.

The interface 125 of the integrated circuit device 101 can be configured to support a memory access protocol, or a storage access protocol or any combination thereof. Thus, an external device (e.g., a processor, a central processing unit) can send commands to the interface 125 to access the storage capacity provided by the memory cell array 113.

For example, the interface 125 can be configured to support a connection and communication protocol on a computer bus, such as a peripheral component interconnect express (PCIe) bus, a serial advanced technology attachment (SATA) bus, a universal serial bus (USB) bus, a compute express link, etc. In some embodiments, the interface 125 can be configured to include an interface of a solid-state drive (SSD), such as a ball grid array (BGA) SSD. In some embodiments, the interface 125 is configured to include an interface of a memory module, such as a double data rate (DDR) memory module, a dual in-line memory module, etc. The interface 125 can be configured to support a communication protocol such as a protocol according to non-volatile memory express (NVMe), non-volatile memory host controller interface specification (NVMHCIS), etc.

The integrated circuit device 101 can appear to be a memory sub-system from the point of view of a device in communication with the interface 125. Through the interface 125, an external device (e.g., a processor, a central processing unit) can access the storage capacity of the memory cell array 113. For example, the external device can store and update weight matrices and instructions for the inference logic circuit 123, retrieve images generated by the image sensing pixel array 111 and processed by the image processing logic circuit 121, and retrieve results of inference computations controlled by the inference logic circuit 123.

In FIG. 1, the interface 125 is positioned, for example, at the bottom side of the integrated circuit device 101, while the image sensor chip is positioned at the top side of the integrated device 101 to receive incident light for generating images.

The voltage drivers 115 in FIG. 1 can be controlled to apply voltages to program the threshold voltages of memory cells in the array 113. Data stored in the memory cells can be represented by the levels of the programmed threshold voltages of the memory cells.

A typical memory cell in the array 113 has a nonlinear current to voltage curve. When the threshold voltage of the memory cell is programmed to a first level to represent a stored value of one, the memory cell allows a predetermined amount of current to go through when a predetermined read voltage higher than the first level is applied to the memory cell. When the predetermined read voltage is not applied (e.g., the applied voltage is zero), the memory cell allows a negligible amount of current to go through, compared to the predetermined amount of current.

On the other hand, when the threshold voltage of the memory cell is programmed to a second level higher than the predetermined read voltage to represent a stored value of zero, the memory cell allows a negligible amount of current to go through, regardless of whether the predetermined read voltage is applied. Thus, when a bit of weight is stored in the memory as discussed above, and a bit of input is used to control whether to apply the predetermined read voltage, the amount of current going through the memory cell as a multiple of the predetermined amount of current corresponds to the digital result of the stored bit of weight multiplied by the bit of input. Currents representative of the results of 1-bit by 1-bit multiplications can be summed in an analog form before being digitized for shifting and summing to perform multiplication and accumulation of multi-bit weights against multi-bit inputs, as further discussed below.

FIG. 2 shows the computation of a column of weight bits multiplied by a column of input bits to provide an accumulation result according to one embodiment. In FIG. 2, a column of memory cells 207, 217, . . . , 227 (e.g., in the memory cell array 113 of an integrated circuit device 101) can be programmed to have threshold voltages at levels representative of weights stored one bit per memory cell.

Voltage drivers 203, 213, . . . , 223 (e.g., in the voltage drivers 115 of an integrated circuit device 101) are configured to apply voltages 205, 215, . . . , 225 to the memory cells 207, 217, . . . , 227 respectively according to their received input bits 201, 211, . . . , 221.

For example, when the input bit 201 has a value of one, the voltage driver 203 applies the predetermined read voltage as the voltage 205, causing the memory cell 207 to output the predetermined amount of current as its output current 209 if the memory cell 207 has a threshold voltage programmed at a lower level, which is lower than the predetermined read voltage, to represent a stored weight of one, or to output a negligible amount of current as its output current 209 if the memory cell 207 has a threshold voltage programmed at a higher level, which is higher than the predetermined read voltage, to represent a stored weight of zero.

However, when the input bit 201 has a value of zero, the voltage driver 203 applies a voltage (e.g., zero) lower than the lower level of threshold voltage as the voltage 205 (e.g., does not apply the predetermined read voltage), causing the memory cell 207 to output a negligible amount of current at its output current 209 regardless of the weight stored in the memory cell 207. Thus, the output current 209 as a multiple of the predetermined amount of current is representative of the result of the weight bit, stored in the memory cell 207, multiplied by the input bit 201.

Similarly, the current 219 going through the memory cell 217 as a multiple of the predetermined amount of current is representative of the result of the weight bit, stored in the memory cell 217, multiplied by the input bit 211; and the current 229 going through the memory cell 227 as a multiple of the predetermined amount of current is representative of the result of the weight bit, stored in the memory cell 227, multiplied by the input bit 221.

The output currents 209, 219, . . . , and 229 of the memory cells 207, 217, . . . 227 are connected to a common line 241 for summation. In one example, common line 241 is a bitline. A constant voltage (e.g., ground or −1 V) is maintained on the bitline when summing the output currents.

The summed current 231 is compared to the unit current 232, which is equal to the predetermined amount of current, by a digitizer 233 of an analog to digital converter 245 to determine the digital result 237 of the column of weight bits, stored in the memory cells 207, 217, . . . , 227 respectively, multiplied by the column of input bits 201, 211, . . . , 221 respectively with the summation of the results of multiplications.

The sum of negligible amounts of currents from memory cells connected to the line 241 is small when compared to the unit current 232 (e.g., the predetermined amount of current). Thus, the presence of the negligible amounts of currents from memory cells does not alter the result 237 and is negligible in the operation of the analog to digital converter 245.

In FIG. 2, the voltages 205, 215, . . . , 225 applied to the memory cells 207, 217, . . . , 227 are representative of digitized input bits 201, 211, . . . , 221; the memory cells 207, 217, . . . , 227 are programmed to store digitized weight bits; and the currents 209, 219, . . . , 229 are representative of digitized results.

The result 237 is an integer that is no larger than the count of memory cells 207, 217, . . . , 227 connected to the line 241. The digitized form of the output currents 209, 219, . . . , 229 can increase the accuracy and reliability of the computation implemented using the memory cells 207, 217, . . . , 227.

In general, a weight involving a multiplication and accumulation operation can be more than one bit. Multiple columns of memory cells can be used to store the different significant bits of weights, as illustrated in FIG. 3 to perform multiplication and accumulation operations.

The circuit illustrated in FIG. 2 can be considered a multiplier-accumulator unit configured to operate on a column of 1-bit weights and a column of 1-bit inputs. Multiple such circuits can be connected in parallel to implement a multiplier-accumulator unit to operate on a column of multi-bit weights and a column of 1-bit inputs, as illustrated in FIG. 3.

The circuit illustrated in FIG. 2 can also be used to read the data stored in the memory cells 207, 217, . . . , 227. For example, to read the data or weight stored in the memory cell 207, the input bits 211, . . . , 221 can be set to zero to cause the memory cells 217, . . . , 227 to output a negligible amount of currents into the line 241 (e.g., as a bitline). The input bit 201 is set to one to cause the voltage driver 203 to apply the predetermined read voltage. Thus, the result 237 from the digitizer 233 provides the data or weight stored in the memory cell 207. Similarly, the data or weight stored in the memory cell 217 can be read via applying one as the input bit 211 and zeros as the remaining input bits in the column; and data or weight stored in the memory cell 227 can be read via applying one as the input bit 221 and zeros as the other input bits in the column.

In general, the circuit illustrated in FIG. 2 can be used to select any of the memory cells 207, 217, . . . , 227 for read or write. A voltage driver (e.g., 203) can apply a programming voltage pulse (e.g., one or more pulses or other waveform, as appropriate for a memory cell type) to adjust the threshold voltage of a respective memory cell (e.g., 207) to erase data, to store data or a weight, etc.

FIG. 3 shows the computation of a column of multi-bit weights multiplied by a column of input bits to provide an accumulation result according to one embodiment. In FIG. 3, a weight 250 in a binary form has a most significant bit 257, a second most significant bit 258, . . . , a least significant bit 259. The significant bits 257, 258, . . . , 259 can be stored in memory cells 207, 206, . . . , 208 in a number of columns respectively in an array 273. The significant bits 257, 258, . . . , 259 of the weight 250 are to be multiplied by the input bit 201 represented by the voltage 205 applied on a line 281 (e.g., a wordline) by a voltage driver 203 (e.g., as in FIG. 2).

Similarly, memory cells 217, 216, . . . , 218 can be used to store the corresponding significant bits of a next weight to be multiplied by a next input bit 211 represented by the voltage 215 applied on a line 282 (e.g., a wordline) by a voltage driver 213 (e.g., as in FIG. 2); and memory cells 227, 226, . . . , 228 can be used to store corresponding of a weight to be multiplied by the input bit 221 represented by the voltage 225 applied on a line 283 (e.g., a wordline) by a voltage driver 223 (e.g., as in FIG. 2).

The most significant bits (e.g., 257) of the weights (e.g., 250) stored in the respective rows of memory cells in the array 273 are multiplied by the input bits 201, 211, . . . , 221 represented by the voltages 205, 215, . . . , 225 and then summed as the current 231 in a line 241 and digitized using a digitizer 233, as in FIG. 2, to generate a result 237 corresponding to the most significant bits of the weights.

Similarly, the second most significant bits (e.g., 258) of the weights (e.g., 250) stored in the respective rows of memory cells in the array 273 are multiplied by the input bits 201, 211, . . . , 221 represented by the voltages 205, 215, . . . , 225 and then summed as a current in a line 242 and digitized to generate a result 236 corresponding to the second most significant bits.

Similarly, the least significant bits (e.g., 259) of the weights (e.g., 250) stored in the respective rows of memory cells in the array 273 are multiplied by the input bits 201, 211, . . . , 221 represented by the voltages 205, 215, . . . , 225 and then summed as a current in a line 243 and digitized to generate a result 238 corresponding to the least significant bit.

The most significant bit can be left shifted by one bit to have the same weight as the second significant bit, which can be further left shifted by one bit to have the same weight as the next significant bit. Thus, the result 237 generated from multiplication and summation of the most significant bits (e.g., 257) of the weights (e.g., 250) can be applied an operation of left shift 247 by one bit; and the operation of add 246 can be applied to the result of the operation of left shift 247 and the result 236 generated from multiplication and summation of the second most significant bits (e.g., 258) of the weights (e.g., 250). The operations of left shift (e.g., 247, 249) can be used to apply weights of the bits (e.g., 257, 258, . . . ) for summation using the operations of add (e.g., 246, . . . , 248) to generate a result 251. Thus, the result 251 is equal to the column of weights in the array 273 of memory cells multiplied by the column of input bits 201, 211, . . . , 221 with multiplication results accumulated.

In general, an input involving a multiplication and accumulation operation can be more than 1 bit. For example, columns of input bits can be applied one column at a time to the weights stored in the array 273 of memory cells to obtain the result of a column of weights multiplied by a column of inputs with results accumulated as illustrated in FIG. 4.

The circuit illustrated in FIG. 3 can be used to read the data stored in the array 273 of memory cells. For example, to read the data or weight 250 stored in the memory cells 207, 206, . . . , 208, the input bits 211, . . . , 221 can be set to zero to cause the memory cells 217, 216, . . . , 218, . . . , 227, 226, . . . , 228 to output a negligible amount of currents into the line 241, 242, . . . , 243 (e.g., as bitlines). The input bit 201 is set to one to cause the voltage driver 203 to apply the predetermined read voltage as the voltage 205. Thus, the results 237, 236, . . . , 238 from the digitizers (e.g., 233) connected to the lines 241, 242, . . . , 243 provide the bits 257, 258, . . . , 259 of the data or weight 250 stored in the row of memory cells 207, 206, . . . , 208. Further, the result 251 computed from the operations of shift 247, 249, . . . and operations of add 246, . . . , 248 provides the weight 250 in a binary form.

In general, the circuit illustrated in FIG. 3 can be used to select any row of the memory cell array 273 for read. Optionally, different columns of the memory cell array 273 can be driven by different voltage drivers. Thus, the memory cells (e.g., 207, 206, . . . , 208) in a row can be programmed to write data in parallel (e.g., to store the bits 257, 258, . . . , 259) of the weight 250.

Figure 4:
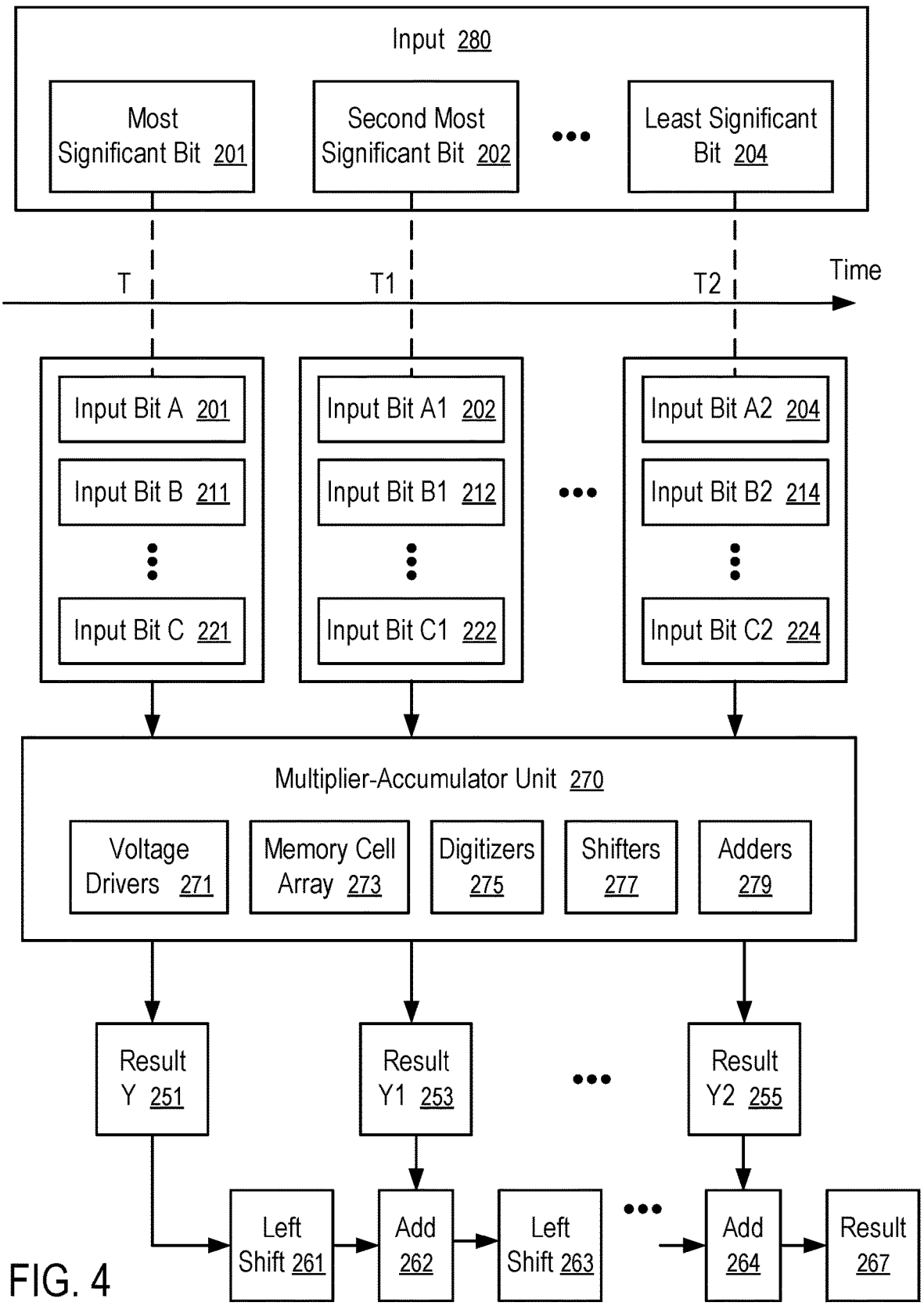
FIG. 4 shows the computation of a column of multi-bit weights multiplied by a column of multi-bit inputs using inputs at multiple time instances to provide an accumulation result according to one embodiment.

FIG. 4 shows the computation of a column of multi-bit weights multiplied by a column of multi-bit inputs using inputs at multiple time instances to provide an accumulation result according to one embodiment. In FIG. 4, the significant bits of inputs (e.g., 280) are applied to a multiplier-accumulator unit 270 at a plurality of time instances T, T1, . . . , T2.

For example, a multi-bit input 280 can have a most significant bit 201, a second most significant bit 202, . . . , a least significant bit 204. At time T, the most significant bits 201, 211, . . . , 221 of the inputs (e.g., 280) are applied to the multiplier-accumulator unit 270 to obtain a result 251 of weights (e.g., 250), stored in the memory cell array 273, multiplied by the column of bits 201, 211, . . . , 221 with summation of the multiplication results.

For example, the multiplier-accumulator unit 270 can be implemented in a way as illustrated in FIG. 3. The multiplier-accumulator unit 270 has voltage drivers 271 connected to apply voltages 205, 215, . . . , 225 representative of the input bits 201, 211, . . . , 221. The multiplier-accumulator unit 270 has a memory cell array 273 storing bits of weights as in FIG. 3. The multiplier-accumulator unit 270 has digitizers 275 to convert currents summed on lines 241, 242, . . . , 243 for columns of memory cells in the array 273 to output results 237, 236, . . . , 238. The multiplier-accumulator unit 270 has shifters 277 and adders 279 connected to combine the column result 237, 236, . . . , 238 to provide a result 251 as in FIG. 3.

Similarly, at time T1, the second most significant bits 202, 212, . . . , 222 of the inputs (e.g., 280) are applied to the multiplier-accumulator unit 270 to obtain a result 253 of weights (e.g., 250) stored in the memory cell array 273 and multiplied by the vector of bits 202, 212, . . . , 222 with summation of the multiplication results.

Similarly, at time T2, the least significant bits 204, 214, . . . , 224 of the inputs (e.g., 280) are applied to the multiplier-accumulator unit 270 to obtain a result 255 of weights (e.g., 250), stored in the memory cell array 273, multiplied by the vector of bits 202, 212, . . . , 222 with summation of the multiplication results.

The result 251 generated from multiplication and summation of the most significant bits 201, 211, . . . , 221 of the inputs (e.g., 280) can be applied an operation of left shift 261 by one bit; and the operation of add 262 can be applied to the result of the operation of left shift 261 and the result 253 generated from multiplication and summation of the second most significant bits 202, 212, . . . , 222 of the inputs (e.g., 280). The operations of left shift (e.g., 261, 263) can be used to apply weights of the bits (e.g., 201, 202, . . . ) for summation using the operations of add (e.g., 262, . . . , 264) to generate a result 267. Thus, the result 267 is equal to the weights (e.g., 250) in the array 273 of memory cells multiplied by the column of inputs (e.g., 280) respectively and then summed.

A plurality of multiplier-accumulator units 270 can be connected in parallel to operate on a matrix of weights multiplied by a column of multi-bit inputs over a series of time instances T, T1, . . . , T2.

Figure 5:
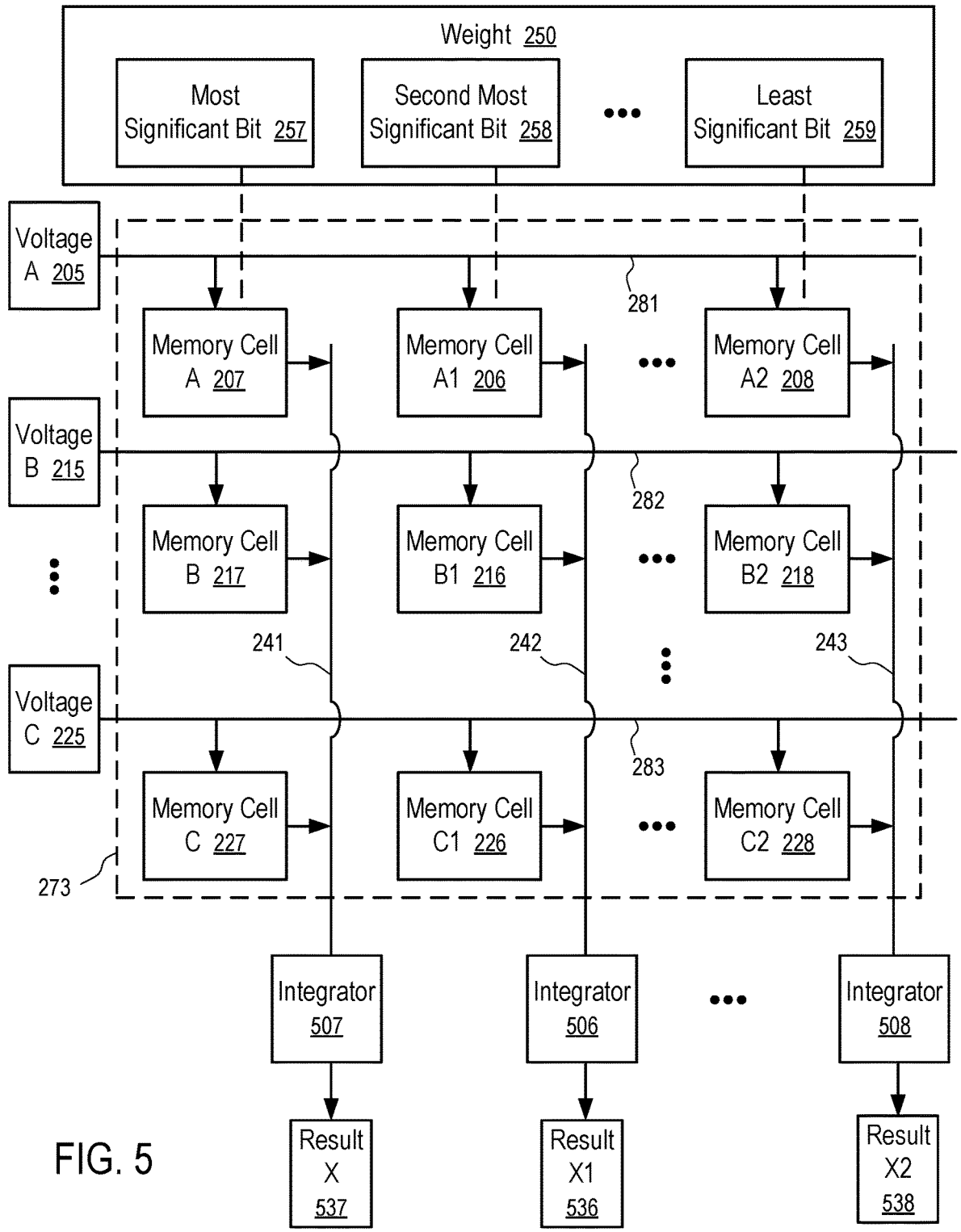
FIG. 5 shows the computation of a column of multi-bit weights multiplied by a column of multi-bit inputs using pulse width modulation (PWM) of the inputs to provide an accumulation result according to one embodiment.

FIG. 5 shows the computation of a column of multi-bit weights 250 multiplied by a column of multi-bit inputs using pulse width modulation (PWM) of the inputs to provide an accumulation result according to one embodiment.

Memory cell array 273 includes various memory cells arranged in columns as illustrated. Each memory cell is programmable to store a respective bit for one of multi-bit weights 250. Each memory cell has a position in the array corresponding to a significance (e.g., MSB, LSB) of its stored respective bit. For example, memory cell 207 is in a column of the array that corresponds to a most significant bit 257, and memory cell 208 is in a column that corresponds to a least significant bit 259, similarly as discussed above.

Voltage drivers are configured to apply voltage pulses to the memory cells. The width of each pulse represents one of the multi-bit inputs (e.g., a pulse has a time length equal to a binary value of each input). Each pulse is applied with a constant voltage for a time corresponding to the pulse width.

For example, a column of voltage drivers 203, 213, . . . , 223 (e.g., as in FIG. 2) can apply, according to the column of multi-bit inputs, voltages 205, 215, . . . , 225 to the column of memory cells 207, 217, . . . , 227 respectively. The voltages are in the form of voltage pulses each having a width representing a respective one of the multi-bit inputs. The voltages are also applied to other columns of the memory cells as illustrated.

A line 241 is coupled to a first column of memory cells each storing a bit of a first significance (e.g., MSB 257). The line 241 is configured to collect output currents from each of these memory cells for accumulating a first electrical charge. For example, output currents from the column of memory cells 207, 217, . . . , 227 are accumulated in an analog form by integrator 507 coupled to line 241.

A line 242 similarly collects output currents from each of a second column of memory cells each storing a bit of second significance less than the first significance (e.g., $2^{nd}$ MSB 258). Line 242 collects the output currents from these cells for accumulating a second electrical charge. Integrator 506 accumulates these output currents.

A line 243 is coupled to a third column of memory cells each storing a bit of a third significance less than the second significance (e.g., LSB 259). Line 243 collects output currents from each of these memory cells for accumulating a third electrical charge. Integrator 508 accumulates these output currents.

A logic circuit (not shown) is configured to output the final accumulation result determined based on the accumulated first, second, and third charges above. The logic circuit includes shifters and adders (not shown) such as described above to perform shifting and adding of intermediate results to provide the final accumulation result.

In one example, integrators 507, 506, 508 include digitizers that convert the accumulated first, second, and third charges into digital outputs (e.g., Results 537, 536, 538). The digital outputs are shifted and added similarly as described above based on a bit significance corresponding to each digital output. The result of the foregoing shifting and adding is the final accumulation result from the multiplication of the column of multi-bit weights by the column of multi-bit inputs.

In one embodiment, the memory cells are operated in a sub-threshold mode. In one example, the memory cells are chalcogenide or NAND or NOR flash memory cells. The applied voltages are controlled so that the memory cells remain in the sub-threshold mode during the multiplication. It should be noted that operation in a sub-threshold mode for NAND or NOR memory cells is characterized differently than for chalcogenide memory cells.

In one embodiment, each of lines 241, 242, 243 is coupled to a respective capacitor to accumulate the charge from the line.

In one embodiment, a memory device with NAND memory cells uses pulse width modulation (PWM) for performing unsigned multi-bit to multi-bit multiplication. An input voltage pulse (e.g., voltages 205, 215, 225) is applied to multiple memory cells (e.g., 207, 217, 227, 206, 216, 226, etc.) to produce output currents from each memory cell. The width of the voltage pulse (e.g., a length of time between 5 to 100 nanoseconds) is proportional to the respective multi-bit input. The input voltage pulse is a constant voltage (e.g., 2-4 V across each memory cell).

The output current from each memory cell is integrated over time (e.g., by integrators 507, 506, 508) to obtain the input multiplied by the 1-bit weight stored in the respective memory cell. The results from each memory cell can be digitized as a multiple of a predetermined amount of current integrated over a unit of time, corresponding to the width of the voltage pulse for an input of "1". The digitized outputs (e.g., Results 537, 536, 538) are shifted according to their positions (e.g., MSB 257, . . . LSB 259) in the multi-bit weight 250 for summation.

The current integration over time can be implemented via charging a capacitor (not shown) using the output current, or using methods other than a capacitor. In one embodiment, the current integration is performed using any of various types of integrators. In one example, each integrator includes a capacitor to collect charge from a common line (e.g., line 241) while the respective voltage pulses 205, 215, 225 are applied to the memory cells (e.g., 207, 217, 227) having outputs connected to the common line.

The multiplier-accumulator units (e.g., 270) illustrated in FIGS. 2-5 can be implemented in integrated circuit device 101 in FIG. 1.

In one implementation, a memory chip (e.g., integrated circuit die 105) includes circuits of voltage drivers, digitizers, shifters, and adders to perform the operations of multiplication and accumulation. The memory chip can further include control logic configured to control the operations of the drivers, digitizers, shifters, and adders to perform the operations as in FIGS. 2-5.

The inference logic circuit 123 can be configured to use the computation capability of the memory chip (e.g., integrated circuit die 105) to perform inference computations of an application, such as the inference computation of an artificial neural network. The inference results can be stored in a portion of the memory cell array 113 for retrieval by an external device via the interface 125 of the integrated circuit device 101.

Optionally, at least a portion of the voltage drivers, the digitizers, the shifters, the adders, and the control logic can be configured in the integrated circuit die 109 for the logic chip.

The memory cells (e.g., memory cells of array 113) can include volatile memory, or non-volatile memory, or both. Examples of non-volatile memory include flash memory, memory units formed based on negative-and (NAND) logic gates, negative-or (NOR) logic gates, phase-change memory (PCM), magnetic memory (MRAM), resistive random-access memory, cross point storage and memory devices. A cross point memory device can use transistor-less memory elements, each of which has a memory cell and a selector that are stacked together as a column. Memory element columns are connected via two layers of wires running in perpendicular directions, where wires of one layer run in one direction in the layer located above the memory element columns, and wires of the other layer are in another direction and in the layer located below the memory element columns. Each memory element can be individually selected at a cross point of one wire on each of the two layers. Cross point memory devices are fast and non-volatile and can be used as a unified memory pool for processing and storage. Further examples of non-volatile memory include read-only memory (ROM), programmable read-only memory (PROM), erasable programmable read-only memory (EPROM) and electronically erasable programmable read-only memory (EEPROM) memory, etc. Examples of volatile memory include dynamic random-access memory (DRAM) and static random-access memory (SRAM).

The integrated circuit die 105 and the integrated circuit die 109 can include circuits to address memory cells in the memory cell array 113, such as a row decoder and a column decoder to convert a physical address into control signals to select a portion of the memory cells for read and write. Thus, an external device can send commands to the interface 125 to write weights (e.g., 250) into the memory cell array 113 and to read results from the memory cell array 113.

In some implementations, the image processing logic circuit 121 can also send commands to the interface 125 to write images into the memory cell array 113 for processing.

Figure 6:
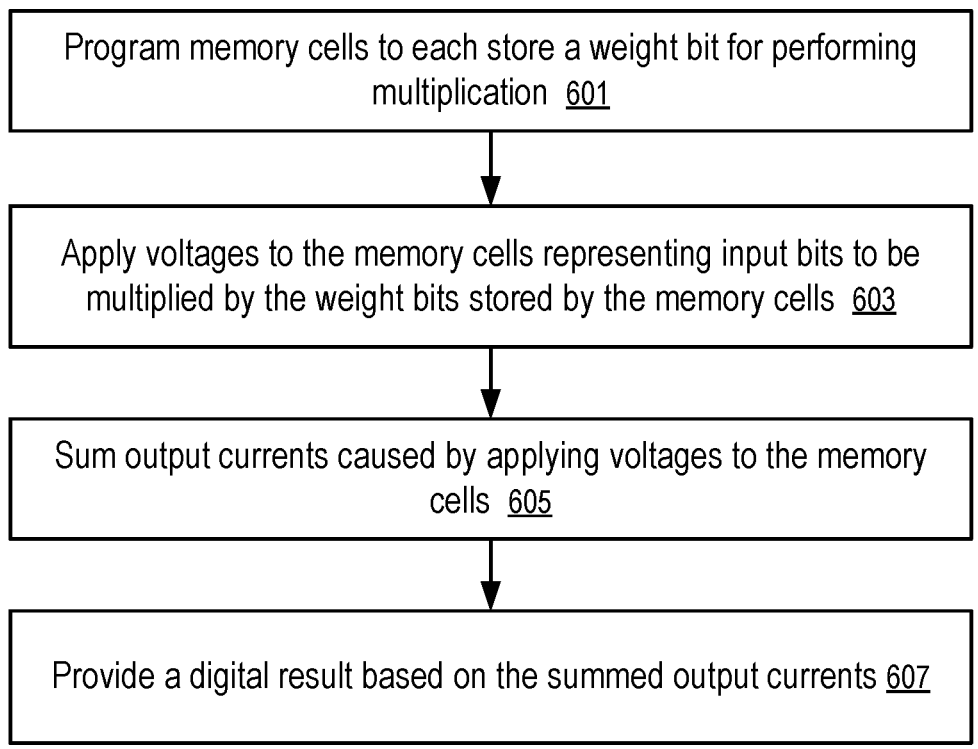
FIG. 6 shows a method of computation in an integrated circuit device according to one embodiment.

FIG. 6 shows a method of computation in an integrated circuit device according to one embodiment. For example, the method of FIG. 6 can be performed in an integrated circuit device 101 of FIG. 1 using multiplication and accumulation techniques of FIGS. 2-4.

The method of FIG. 6 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method of FIG. 6 is performed at least in part by one or more processing devices (e.g., a controller of inference logic circuit 123 of FIG. 1).

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 601, memory cells are each programmed to store a weight bit for performing multiplication. In one example, memory cells of memory cell array 113 are programmed. In one example, memory cells 207, 206, 208 are programmed to store weight bits of different bit significance. The weight bits correspond to a multi-bit weight 250.

At block 603, voltages are applied to the memory cells. The voltages represent input bits to be multiplied by the weight bits stored by the memory cells. In one example, voltage drivers apply input voltages 205, 215, 225.

At block 605, output currents from the memory cells caused by applying the voltages are summed. In one example, the output currents are collected and summed using line 241 as in FIG. 3.

At block 607, a digital result based on the summed output currents is provided. In one example, the summed output currents are used to generate Result X 237 of FIG. 3.

In one embodiment, a device comprises: a memory cell array (e.g., 113) having memory cells, wherein each memory cell is programmable to store a respective weight for performing a multiplication; voltage drivers (e.g., 115) configured to apply voltages to the memory cells for performing the multiplication, the voltages representing an input to be multiplied by the respective weight for each memory cell, wherein the voltages are applied so that operation of the memory cells remains in a sub-threshold mode during the multiplication; a line coupled to the memory cells, wherein the line is configured to sum output currents from each of the memory cells; and a digitizer (e.g., current digitizer 117) configured to generate a result for the multiplication based on the summed output currents.

In one embodiment, the line is a bitline.

In one embodiment, the memory cells do not threshold (e.g., do not snap) when operating in the sub-threshold mode.

In one embodiment, each memory cell is configured to output: a predetermined amount of current in response to an applied voltage when the memory cell has a threshold voltage programmed to represent a value of one; or a negligible amount of current in response to the applied voltage when the memory cell has a threshold voltage programmed to represent a value of zero.

In one embodiment, the negligible amount of current is less than five percent of the predetermined amount of current.

In one embodiment, some of the memory cells have a first threshold voltage programmed to represent a value of one, and the applied voltage is less than the first threshold voltage.

In one embodiment, the applied voltage is less than the first threshold voltage by at least 0.5 volts.

In one embodiment, the device further comprises an interface (e.g., 125) operable for a host system to write data into the memory cell array and to read data from the memory cell array.

In one embodiment, the memory cells include first and second memory cells; the respective weight stored by the first memory cell is a most significant bit (MSB) of a multi-bit weight; and the respective weight stored by the second memory cell is a least significant bit (LSB) of the multi-bit weight.

In one embodiment, the digitizer is configured in an analog-to-digital converter.

In one embodiment, each of the memory cells is a chalcogenide memory cell.

In one embodiment, a method comprises: programming memory cells in a memory cell array, wherein each memory cell is programmed to store a respective weight bit for performing a multiplication; applying voltages to the memory cells for performing the multiplication, each respective voltage representing a respective input bit to be multiplied by the respective weight bit for each memory cell, wherein the voltages are limited so that operation of the memory cells remains in a sub-threshold mode; summing output currents caused by applying the voltages to the memory cells; and providing a digital result based on the summed output currents.

In one embodiment, the respective input bits are a column of input bits; the respective weight bits are a column of weight bits, which is multiplied by the column of input bits when performing the multiplication; the output currents from the memory cells are summed in a bitline; and the digital result is provided by digitizing the summed output currents as a multiple of a predetermined amount of current.

In one embodiment, each respective memory cell is programmed to have a threshold voltage at: a first level to represent a first value of one; and a second level, higher than the first level, to represent a second value of zero; wherein the respective memory cell is configured to, when a predetermined read voltage between the first level and the second level is applied to the memory cell, output the predetermined amount of current when storing the first value of one, or output a negligible amount of current when storing the second value of zero.

In one embodiment, when the respective input bit is zero, a voltage lower than the first level is applied to the corresponding memory cell; and when the respective input bit is one, the predetermined read voltage is applied to the corresponding memory cell.

In one embodiment, an apparatus comprises: a memory cell array comprising memory cells, wherein each memory cell is programmable to store a respective bit for a multi-bit weight, and each memory cell has a position in the array corresponding to a significance (e.g., MSB, LSB) of its stored respective bit; voltage drivers configured to apply respective voltages to the memory cells, wherein each respective voltage represents a one-bit input, and wherein the voltages are applied so that the memory cells do not threshold; a first line coupled to first memory cells storing a respective bit of a first significance (e.g., MSB), wherein the first line is configured to sum first output currents from each of the first memory cells; a second line coupled to second memory cells storing a respective bit of a second significance (e.g., LSB), wherein the second significance is less than the first significance, and the second line is configured to sum second output currents from each of the second memory cells; and a logic circuit configured to provide an accumulation result (e.g., Result Y 251 of FIG. 3) based on the summed first output currents and the summed second output currents.

In one embodiment, the apparatus further comprises: at least one digitizer configured to provide a first result (e.g., Result X 237) based on the summed first output currents, and provide a second result (e.g., Result X2 238) based on the summed second output currents; at least one shifter configured to at least shift the first result (e.g., left shift the MSB result); and at least one adder configured to provide the accumulation result by at least adding the shifted first result to the second result.

In one embodiment, the first result is left shifted by one bit.

In one embodiment, the accumulation result is from multiplication of a column of multi-bit weights by a column of input bits.

In one embodiment, the memory cells are phase-change memory cells.

In one embodiment, an apparatus comprises: a memory cell array comprising memory cells, wherein each memory cell is programmable to store a respective bit for a multi-bit weight, and each memory cell has a position in the array corresponding to a significance (e.g., MSB, LSB) of its stored respective bit; and a multiplier-accumulator unit configured to perform a multiplication of the multi-bit weight by a multi-bit input and provide an accumulation result, wherein: the memory cells remain in a sub-threshold mode (e.g., cells do not threshold) during the multiplication; each bit of the multi-bit input is applied to the multiplier-accumulator unit at a respective time instance (e.g., T, T1, T2 as in FIG. 4) to obtain a respective result (e.g., Result Y 251), wherein the respective result is based on summing output currents from the memory cells; and the accumulation result (e.g., Result 267) is based on the respective results obtained from applying the bits of the multi-bit input.

In one embodiment, summing the output currents comprises summing currents on lines for columns of memory cells in the memory cell array to provide column results for the applied bit.

In one embodiment, the multiplier-accumulator unit (e.g., 270) comprises shifters and adders configured to combine the column results to provide the respective result for each applied bit.

In one embodiment, each respective result is shifted left according to a position of the applied bit of the multi-bit input to provide shifted results; and the shifted results are added to provide the accumulation result.

In one embodiment, an apparatus comprises: a memory cell array (e.g., 273) comprising memory cells, wherein each memory cell is programmable to store a respective bit for a multi-bit weight (e.g., 250), and each memory cell has a position in the array corresponding to a significance (e.g., MSB, LSB) of its stored respective bit; voltage drivers configured to apply voltage pulses to the memory cells, wherein a respective width (e.g., 20 or 40 nanoseconds) of each pulse represents a multi-bit input; a first line (e.g., 241) coupled to first memory cells storing a bit of a first significance (e.g., MSB), wherein the first line is configured to collect first output currents from each of the first memory cells for accumulating a first charge; a second line (e.g., 243) coupled to second memory cells storing a bit of a second significance (e.g., LSB), wherein the second significance is less than the first significance, and the second line is configured to collect second output currents from each of the second memory cells for accumulating a second charge; and a logic circuit configured to output a result based on the accumulated first charge and the accumulated second charge.

In one embodiment, the memory cells remain in a sub-threshold mode while the voltage pulses are applied.

In one embodiment, the apparatus further comprises a first capacitor coupled to the first line to accumulate the first charge, and a second capacitor coupled to the second line to accumulate the second charge.

In one embodiment, the apparatus further comprises at least one digitizer to provide a first result based on the accumulated first charge, and a second result based on the accumulated second charge, wherein the result from the logic circuit is determined at least based on shifting the first result and adding the shifted first result to the second result.

In one embodiment, each voltage pulse has the same constant voltage.

In one embodiment, the apparatus further comprises at least one integrator (e.g., integrators 507, 506, 508) to provide a first result based on the accumulated first charge and a second result based on the accumulated second charge, wherein the result from the logic circuit is based on the first and second results.

In one example, each respective memory cell (e.g., 207, 217, . . . , or 227) in the column of memory cells 207, 217, . . . , 227 can be programmed to have a threshold voltage at: a first level to represent a first value of one; and a second level, higher than the first level, to represent a second value of zero. When applying a predetermined read voltage between the first level and the second level, the respective memory cell (e.g., 207, 217, . . . , or 227) is configured to output the predetermined amount of current 232 when storing the first value of one or to output a negligible amount of current when storing the second value of zero. The resistance of the memory cell (e.g., 207, 217, ... or 227) is nonlinear in a voltage range including its threshold voltage.

When a respective input bit (e.g., 201, 211, ..., or 221) corresponding to the respective memory cell (e.g., 207, 217, ..., or 227) is zero, the voltage driver 203 connected to the respective memory cell (e.g., 207, 217, ..., or 227) applies a voltage lower than the first level to the respective memory cell (e.g., 207, 217, ..., or 227), resulting a negligible amount of current (e.g., 209, 219, ..., or 229) from the respective memory cell (e.g., 207, 217, ..., or 227). When the respective input bit (e.g., 201, 211, ..., or 221) corresponding to the respective memory cell (e.g., 207, 217, ..., or 227) is one, the predetermined read voltage between the first level and the second level is applied to the respective memory cell (e.g., 207, 217, ..., or 227), resulting the predetermined amount of current 232 from the respective memory cell (e.g., 207, 217, ..., or 227) when the respective memory cell (e.g., 207, 217, ..., or 227) is storing the first value of one, or negligible amount of current when the respective memory cell (e.g., 207, 217, ..., or 227) is storing the second value of one.

In one example, the interface 125 can be operable for a host system to write data into the memory cell array 113 and to read data from the memory cell array 113. For example, the host system can send commands to the interface 125 to write the weight matrices of the artificial neural network into the memory cell array 113 and read the output of the artificial neural network, the raw image data from the image sensing pixel array 111, or the processed image data from the image processing logic circuit 121, or any combination thereof.

The inference logic circuit 123 can be programmable and include a programmable processor, an application-specific integrated circuit (ASIC), or a field-programmable gate array (FPGA), or any combination thereof. Instructions for implementing the computations of the artificial neural network can also be written via the interface 125 into the memory cell array 113 for execution by the inference logic circuit 123.

Figure 7:
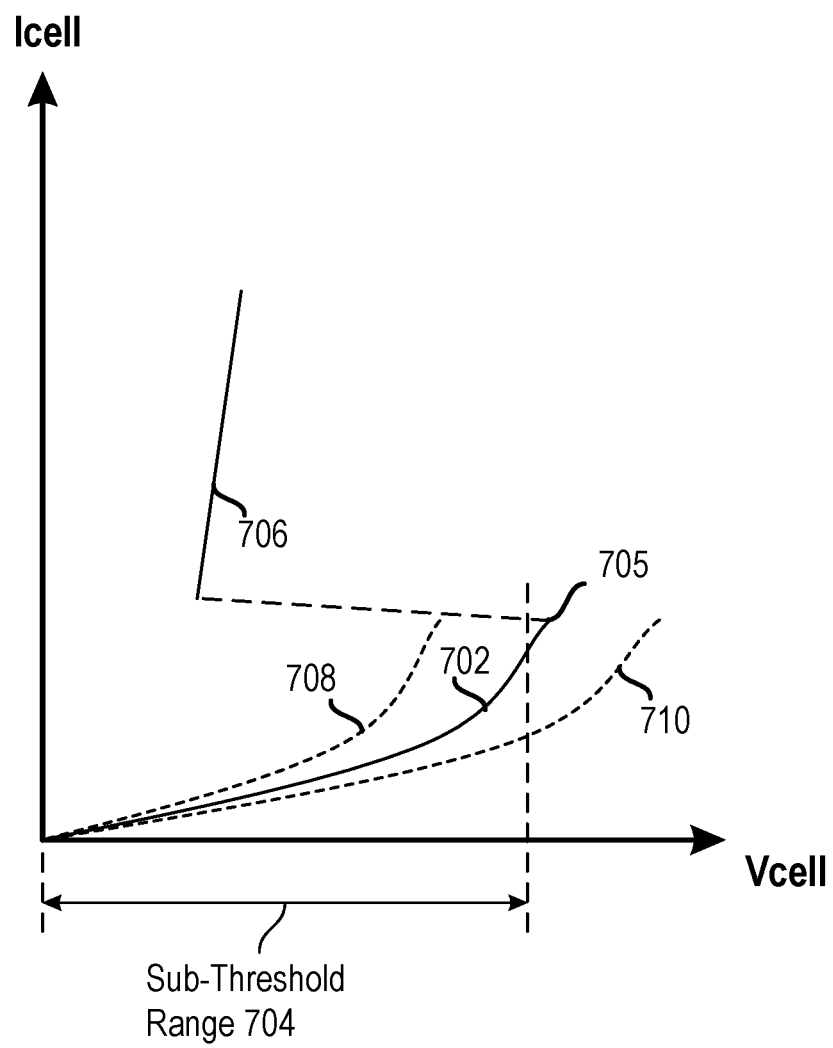
FIG. 7 shows an exemplary current-voltage (IV) curve for a resistive memory cell according to one embodiment.

FIG. 7 shows an exemplary current-voltage (IV) curve 702 for a resistive memory cell according to one embodiment. The memory cell is for example a resistive random access memory (RRAM) cell using a chalcogenide memory element. In one example, the memory cell is configured in memory cell array 113 of FIG. 1.

The memory cell is a two terminal element having a voltage Vcell applied across its terminals. When performing multiplication as described above, the memory cell is operated in a sub-threshold range 704 that is below a threshold point 705 of the memory cell. Sub-threshold range 704 corresponds to a resistive regime of operation for the memory cell.

At threshold point 705, there is a transition of the memory cell from a state of low conductance to significantly high conductance, as illustrated in portion 706 of the IV curve. This transition is sometimes referred to as a snapping or a snap-back of the cell.

When performing multiplication, the memory cell is kept in sub-threshold range 704 below its threshold voltage. Otherwise, the significantly higher currents associated with portion 706 of the IV curve would interfere with proper operation for the multiplication.

IV curves 708, 710 illustrate variations in the IV curve that can be introduced by programming the memory cell. It should be noted that not all RRAM memory cells will exhibit the snap-back behavior described above.

Figure 8:
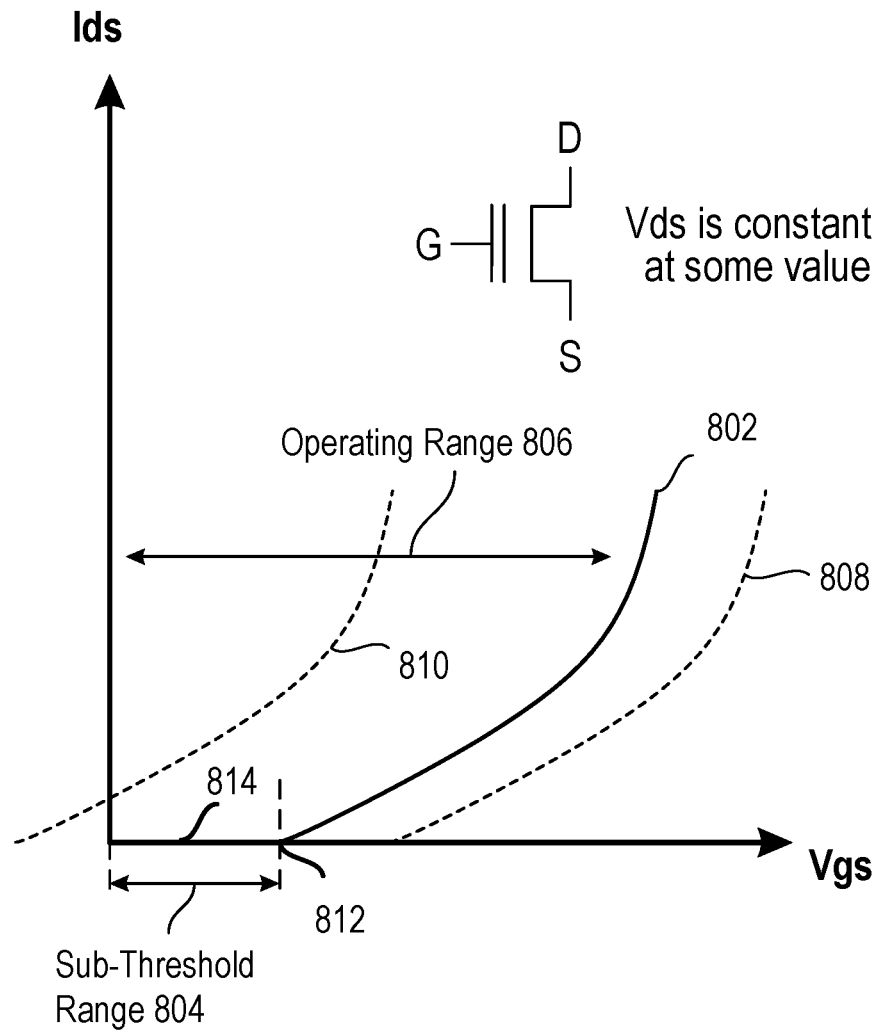
FIG. 8 shows an exemplary current-voltage (IV) curve for a floating gate or charge trap memory cell according to one embodiment.

FIG. 8 shows an exemplary current-voltage (IV) curve 802 for a floating gate or charge trap memory cell according to one embodiment. In one example, the memory cell is a NAND or NOR flash memory cell. In one example, the memory cell is configured in memory cell array 113.

The memory cell is a three-terminal element. IV curve 802 corresponds to a characteristic of the cell when applying a constant drain source voltage Vds across the current terminals of the memory cell. A gate voltage Vgs is applied to the gate of the memory cell. The memory cell generally operates in operating range 806, which includes sub-threshold range 804. Portion 814 of the IV curve corresponds to operation in range 804.

The memory cell exhibits a threshold voltage 812. When performing multiplication as described above, the gate voltage can be below and/or above threshold voltage 812.

IV curves 808, 810 illustrate how the location of IV curve 802 can be varied by programming to shift the curve left or right. By programming the memory cell, the threshold voltage 812 can be moved to lower or higher voltages to represent different logic states.

In one example, a wordline voltage is applied to the gate of the memory cell. In one example, the drain of the memory cell is coupled to a digit line, and the source of the memory cell is coupled to a source line (e.g., an SRC line of a NAND flash memory device).

Figure 9:
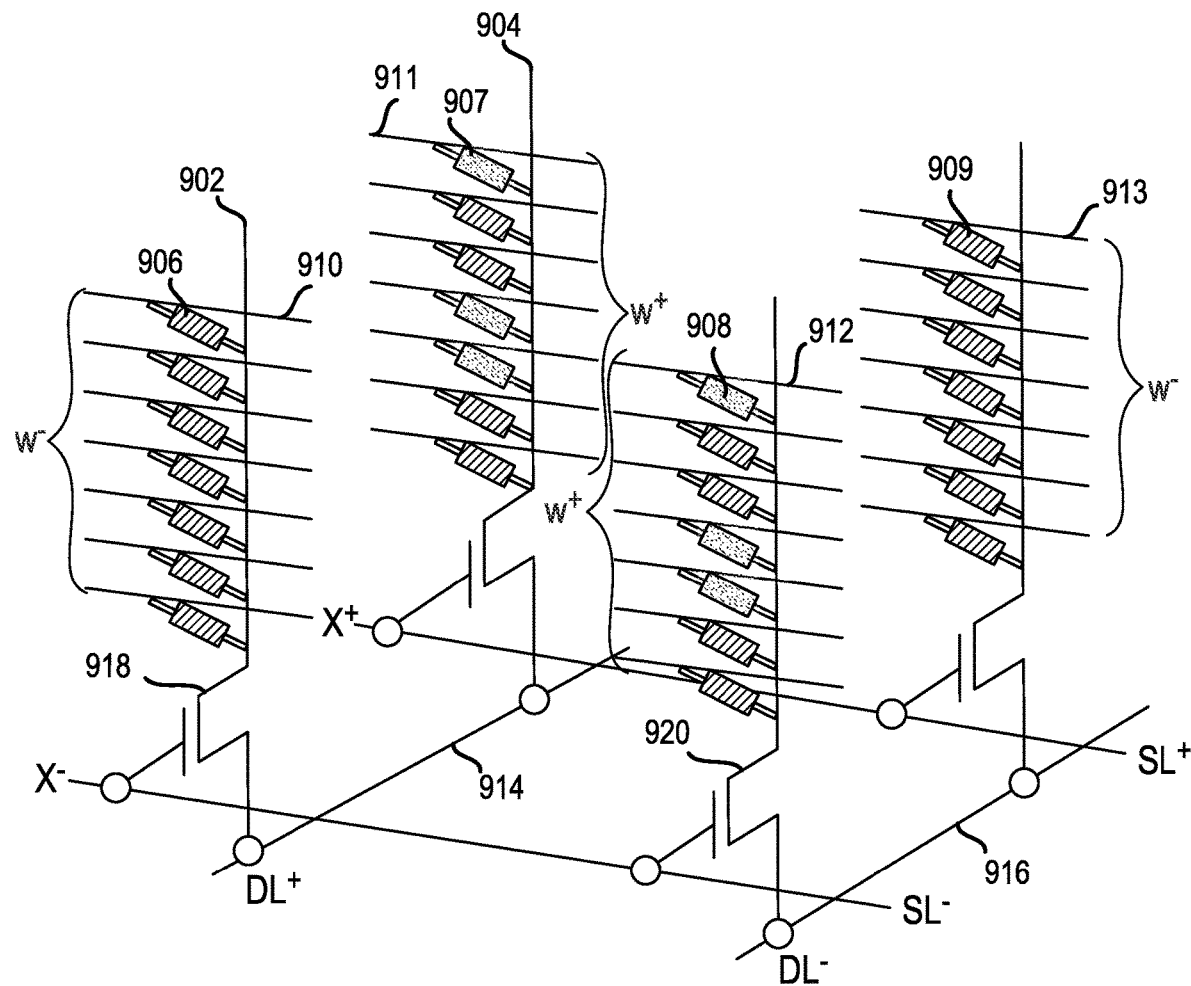
FIG. 9 shows a three-dimensional memory cell array having resistive random-access memory (RRAM) cells according to one embodiment.

FIG. 9 shows a three-dimensional memory cell array having resistive random-access memory (RRAM) cells according to one embodiment. The memory cell array also can be considered to have a NOR configuration with memory cells connected in parallel. The memory cell array illustrated in FIG. 9 is an example of memory cell array 113 of FIG. 1.

The array includes memory cells arranged in various vertical pillars with each cell in a pillar connected to a vertical bitline 902, 904. The array is located above a semiconductor substrate (not shown). The memory cells are also arranged as horizontal tiers. For example, one of the tiers includes memory cells 906, 907, 908, 909. The tiers are stacked vertically. As an example, seven tiers or levels of memory cells are illustrated in FIG. 9.

Each of the cells is connected to a wordline that extends horizontally. Each memory cell is biased by applying a voltage to one of the wordlines and one of the bitlines to which the cell is connected.

When performing multiplication, memory cells in one of the tiers are selected. For example, memory cells 906, 907, 908, 909 are selected by applying a voltage to wordlines 910, 911, 912, 913.

In one embodiment, wordline portions 910, 912 are connected as a single wordline. Similarly, wordline portions 911, 913 are connected as a single wordline.

Each bitline 902, 904 of a pillar is connected to a digit line 914, 916 using a select transistor 918, 920. When performing multiplication, output currents from the selected memory cells of a tier are accumulated on digit lines 914, 916. In some embodiments, an additional distinct select transistor (selector) may be desired at each memory cell location. The selector is connected in series with the corresponding memory cell. In some embodiments of a resistive array, multiple tiers can be selected at the same time for computation.

In one embodiment, each of the memory cells is programmed to store a weight bit for performing multiplication. For the selected tier of memory cells that will be used for multiplication, a voltage is applied on the wordline of each cell so that each memory cell can contribute an extent of output current that is dependent on the programming state of the memory cell.

Voltages are applied to the memory cells when performing multiplication, such as discussed above. The applied voltages represent input bits to be multiplied by the weight bits stored by the memory cells. The voltages are applied to gates of select transistors 918, 920 using select lines (SL−, SL+). Output currents from the memory cells are then summed on digit lines 914, 916, and a digital result provided, such as discussed above.

Figure 10:
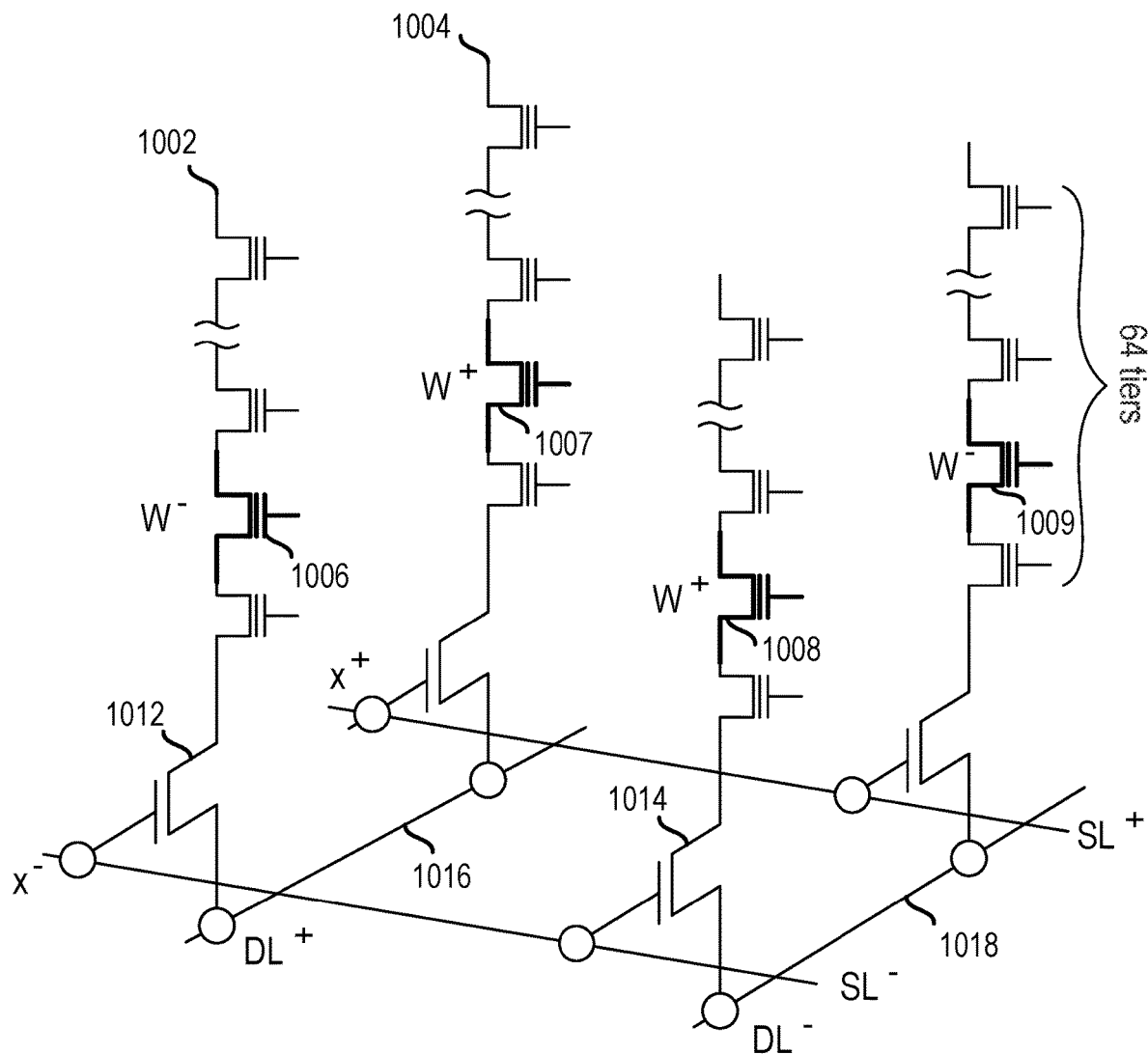
FIG. 10 shows a three-dimensional memory cell array having floating gate or charge trap memory cells in a NAND configuration according to one embodiment.

FIG. 10 shows a three-dimensional memory cell array having floating gate or charge trap memory cells in a NAND configuration according to one embodiment. The memory cell array illustrated in FIG. 10 is an example of memory cell array 113.

The memory cells are arranged vertically in pillars with the memory cells in each pillar connected in series as a string 1002, 1004. The memory cells are also arranged in horizontal tiers or levels (e.g., 64 tiers). For example, memory cells 1006, 1007, 1008, 1009 are arranged in one of these tiers. Each string 1002, 1004 is connected to a common source (SRC) line (not shown) and to a digit line 1016, 1018.

When performing multiplication, the memory cells in one of the tiers are selected (e.g., memory cells 1006, 1007, 1008, 1009 are selected). The cells are selected by applying a read voltage to a gate of each cell. The other non-selected cells in a same string with a selected memory cell are biased by applying a bypass voltage to the gates of the non-selected cells.

Each of the memory cells is connected to a wordline (not shown) that is used to apply the read or bypass voltage above. In one example, a common wordline (not shown) is connected to the gates of memory cells 1006, 1007, 1008, 1009. The common wordline is biased by applying a read voltage.

The memory cells of each string 1002, 1004 are electrically coupled to digit lines 1016, 1018 by select transistors 1012, 1014. Digit lines 1016, 1018 are sometimes referred to as bitlines when configured in a NAND flash memory device.

In one example, one of the tiers of the memory cell array is selected. The non-selected memory cells in the other tiers are disabled. The wordline voltage is made high enough so that each non-selected memory cell is conductive regardless of its programming state (thus, the state of the bypassed cells is ignored as the cells will conduct current regardless of logic state). The overall resistance in each string is dominated by the one selected memory cell, which provides an output current used for accumulation.

In one embodiment, each of the memory cells is programmed to store a weight bit for performing multiplication. For the selected tier of memory cells that will be used for multiplication, a voltage is applied on the wordline so that each memory cell is able to contribute an extent of output current that is dependent on the programming state of the memory cell.

Voltages are applied to the memory cells when performing multiplication, such as discussed above. The applied voltages represent input bits to be multiplied by the weight bits stored by the memory cells. The voltages are applied to gates of select transistors 1012, 1014 using select lines (SL). Output currents from the memory cells are then summed on digit lines 1016, 1018, and a digital result provided, such as discussed above.

In one embodiment, the gate of each memory cell 1006, 1007, 1008, 1009 is connected to a separate, segmented wordline. In one embodiment, the gate of each memory cell is connected to a single conductive layer or sheet that acts as a wordline for all selected cells.

Figure 11:
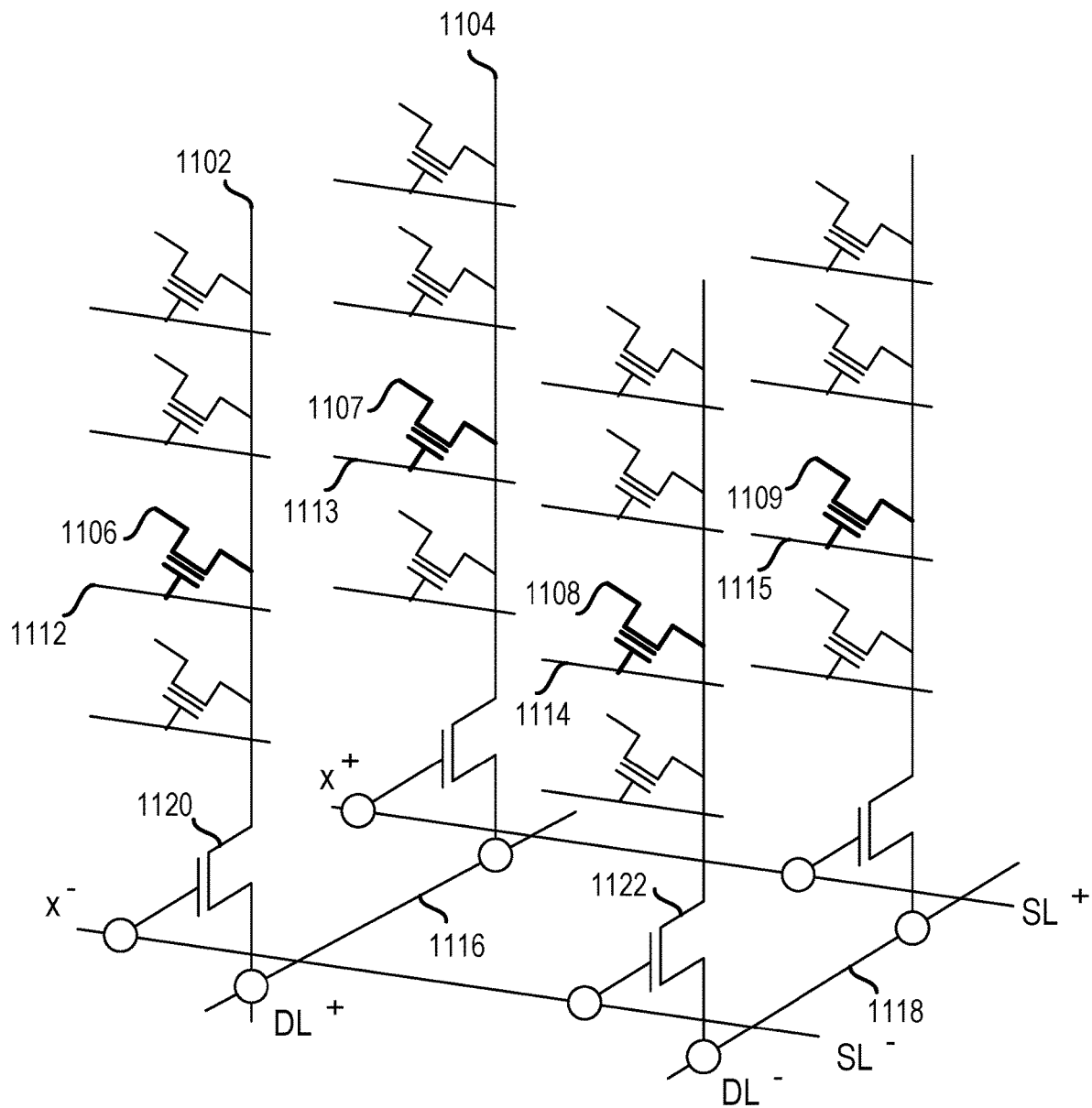
FIG. 11 shows a three-dimensional memory cell array having floating gate memory cells in a NOR configuration according to one embodiment.

FIG. 11 shows a three-dimensional memory cell array having floating gate memory cells in a NOR configuration according to one embodiment. The memory cells are connected in parallel. The memory cell array illustrated in FIG. 11 is an example of memory cell array 113.

Similarly as discussed above, the memory cells are arranged in horizontal tiers. One of the tiers is selected for performing multiplication. For example, memory cells 1106, 1107, 1108, 1109 are selected by applying a gate voltage to each cell. The voltage is applied using wordlines 1112, 1113, 1114, 1115.

In one embodiment, wordlines 1112 and 1114 are connected as a single line. Wordlines 1113 and 1115 are also connected as a single line.

The memory cells of the array are arranged in pillars each having a vertical conducting line 1102, 1104. Each vertical conducting line is coupled to a digit line 1116, 1118 by select transistors 1120, 1122.

In one embodiment, each of the memory cells is programmed to store a weight bit for performing multiplication. For the selected tier of memory cells that will be used for multiplication, a voltage is applied on the wordline so that each memory cell can contribute an extent of output current that is dependent on the programming state of the memory cell.

Voltages are applied to the memory cells when performing multiplication, such as discussed above. The applied voltages represent input bits to be multiplied by the weight bits stored by the memory cells. The voltages are applied to gates of select transistors 1120, 1122 using select lines (SL). Output currents from the memory cells are then summed on digit lines 1116, 1118, and a digital result provided, such as discussed above.

In one embodiment, a device comprises: a memory cell array having memory cells, wherein each memory cell is programmable to store a respective weight for performing a multiplication; voltage drivers configured to apply voltages to the memory cells for performing the multiplication, the voltages representing an input to be multiplied by the respective weight for each memory cell; at least one line coupled to the memory cells, wherein the line is configured to sum output currents from each of the memory cells; and a digitizer configured to generate a result for the multiplication based on the summed output currents.

In one embodiment, each memory cell is programmable to vary a conductance or resistance of the memory cell, and an extent of the output current from the memory cell corresponds to the conductance or resistance.

In one embodiment, the at least one line includes a bitline.

In one embodiment, the memory cells are organized in horizontal tiers of cells, the tiers are stacked vertically above a semiconductor substrate, and first memory cells in a first tier are selected and coupled to the line for performing the multiplication.

In one embodiment, the memory cells are resistive random access memory (RRAM) cells with a local selector, RRAM cells without a local selector, NAND flash memory cells, or NOR flash memory cells.

In one embodiment, the memory cells are programmable by varying charge stored in a floating gate or a charge trap of each memory cell.

In one embodiment, the memory cells are programmable by varying a resistance of each memory cell.

In one embodiment, the memory cells are further organized in pillars of memory cells, and the respective memory cells in each pillar are connected by a respective vertical bitline.

In one embodiment, the respective vertical bitline is coupled to a digit line by a select transistor.

In one embodiment, the respective memory cells in each pillar are connected in series as a string of cells.

In one embodiment, the respective memory cells in each pillar are connected in parallel.

In one embodiment, each memory cell has a floating gate, and the memory cells are arranged in a NOR configuration.

In one embodiment, each memory cell has a floating gate or charge trap, and the memory cells are arranged in a NAND configuration.

In one embodiment, the at least one line comprises digit lines that extend horizontally; the digit lines are located above the semiconductor substrate; and the first memory cells are coupled to the digit lines by select transistors.

In one embodiment, each memory cell is connected to a wordline that extends horizontally, and the memory cell is selected for performing the multiplication by applying a voltage to the wordline.

In one embodiment, the memory cell array is a three-dimensional cross-point array; the memory cells are arranged in vertical pillars; the at least one line extends horizontally; and the at least one line connects to at least a portion of the pillars.

In one embodiment, the memory cells do not snapback.

In one embodiment, operation of the memory cells in the sub-threshold mode comprises operating the memory cells in a resistive regime.

In one embodiment, each memory cell is configured to output: a predetermined amount of current in response to an applied voltage when the memory cell has a threshold voltage programmed to represent a value of one; or a negligible amount of current in response to the applied voltage when the memory cell has a threshold voltage programmed to represent a value of zero.

In one embodiment, the negligible amount of current is less than five percent of the predetermined amount of current.

In one embodiment, some of the memory cells have a first threshold voltage programmed to represent a value of one, and the applied voltage is less than the first threshold voltage.

In one embodiment, the applied voltage is less than the first threshold voltage by at least 0.5 volts.

In one embodiment, the device further comprises an interface operable for a host system to write data into the memory cell array and to read data from the memory cell array.

In one embodiment, the memory cells include first and second memory cells; the respective weight stored by the first memory cell is a most significant bit (MSB) of a multi-bit weight; and the respective weight stored by the second memory cell is a least significant bit (LSB) of the multi-bit weight.

In one embodiment, the digitizer is configured in an analog-to-digital converter.

In one embodiment, each of the memory cells is a chalcogenide memory cell; and the voltages are applied to keep operation of the memory cells in a sub-threshold mode during the multiplication.

In one embodiment, a method comprises: programming memory cells in a memory cell array, wherein each memory cell is programmed to store a respective weight bit for performing a multiplication; applying voltages to the memory cells for performing the multiplication, each respective voltage representing a respective input bit to be multiplied by the respective weight bit for each memory cell, wherein the voltages are limited to keep operation of the memory cells in a sub-threshold mode; summing output currents caused by applying the voltages to the memory cells; and providing a digital result based on the summed output currents.

In one embodiment, the respective input bits are a column of input bits; the respective weight bits are a column of weight bits, which is multiplied by the column of input bits when performing the multiplication; the output currents from the memory cells are summed in a bitline; and the digital result is provided by digitizing the summed output currents as a multiple of a predetermined amount of current.

In one embodiment, each respective memory cell is programmed to have a threshold voltage at: a first level to represent a first value of one; and a second level, higher than the first level, to represent a second value of zero; wherein the respective memory cell is configured to, when a predetermined read voltage between the first level and the second level is applied to the memory cell, output the predetermined amount of current when storing the first value of one, or output a negligible amount of current when storing the second value of zero.

In one embodiment, when the respective input bit is zero, a voltage lower than the first level is applied to the corresponding memory cell; and when the respective input bit is one, the predetermined read voltage is applied to the corresponding memory cell.

Integrated circuit devices 101 (e.g., as in FIG. 1) can be configured as a storage device, a memory module, or a hybrid of a storage device and memory module. Examples of a storage device include a solid-state drive (SSD), a flash drive, a universal serial bus (USB) flash drive, an embedded multi-media controller (eMMC) drive, a universal flash storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The integrated circuit devices 101 (e.g., as in FIG. 1) can be installed in a computing system as a memory sub-system having an embedded image sensor and an inference computation capability. Such a computing system can be a computing device such as a desktop computer, a laptop computer, a network server, a mobile device, a portion of a vehicle (e.g., airplane, drone, train, automobile, or other conveyance), an internet of things (IoT) enabled device, an embedded computer (e.g., one included in a vehicle, industrial equipment, or a networked commercial device), or such a computing device that includes memory and a processing device.

In general, a computing system can include a host system that is coupled to one or more memory sub-systems (e.g., integrated circuit device 101 of FIG. 1). In one example, a host system is coupled to one memory sub-system.

As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

For example, the host system can include a processor chipset (e.g., processing device) and a software stack executed by the processor chipset. The processor chipset can include one or more cores, one or more caches, a memory controller (e.g., NVDIMM controller), and a storage protocol controller (e.g., PCIe controller, SATA controller). The host system uses the memory sub-system, for example, to write data to the memory sub-system and read data from the memory sub-system.

The host system can be coupled to the memory sub-system via a physical host interface. Examples of a physical host interface include, but are not limited to, a serial advanced technology attachment (SATA) interface, a peripheral component interconnect express (PCIe) interface, a universal serial bus (USB) interface, a fibre channel, a serial attached SCSI (SAS) interface, a double data rate (DDR) memory bus interface, a small computer system interface (SCSI), a dual in-line memory module (DIMM) interface (e.g., DIMM socket interface that supports double data rate (DDR)), an open NAND flash interface (ONFI), a double data rate (DDR) interface, a low power double data rate (LPDDR) interface, a compute express link (CXL) interface, or any other interface. The physical host interface can be used to transmit data between the host system and the memory sub-system. The host system can further utilize an NVM express (NVMe) interface to access components (e.g., memory devices) when the memory sub-system is coupled with the host system by the PCIe interface. The physical host interface can provide an interface for passing control, address, data, and other signals between the memory sub-system and the host system. In general, the host system can access multiple memory sub-systems via a same communication connection, multiple separate communication connections, or a combination of communication connections.

The processing device of the host system can be, for example, a microprocessor, a central processing unit (CPU), a processing core of a processor, an execution unit, etc. In some instances, the controller can be referred to as a memory controller, a memory management unit, or an initiator. In one example, the controller controls the communications over a bus coupled between the host system and the memory sub-system. In general, the controller can send commands or requests to the memory sub-system for desired access to memory devices. The controller can further include interface circuitry to communicate with the memory sub-system. The interface circuitry can convert responses received from the memory sub-system into information for the host system.

The controller of the host system can communicate with a controller of the memory sub-system to perform operations such as reading data, writing data, or erasing data at the memory devices, and other such operations. In some instances, the controller is integrated within the same package of the processing device. In other instances, the controller is separate from the package of the processing device. The controller or the processing device can include hardware such as one or more integrated circuits (ICs), discrete components, a buffer memory, or a cache memory, or a combination thereof. The controller or the processing device can be a microcontroller, special-purpose logic circuitry (e.g., a field programmable gate array (FPGA), an application specific integrated circuit (ASIC), etc.), or another suitable processor.

The memory devices can include any combination of the different types of non-volatile memory components and volatile memory components. The volatile memory devices can be, but are not limited to, random access memory (RAM), such as dynamic random access memory (DRAM) and synchronous dynamic random access memory (SDRAM).

Some examples of non-volatile memory components include a negative-and (or, NOT AND) (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices can include one or more arrays of memory cells such as SLCs, MLCs, TLCs, QLCs, PLCs, or any combination of such. In some embodiments, a particular memory device can include an SLC portion, an MLC portion, a TLC portion, a QLC portion, or a PLC portion of memory cells, or any combination thereof. The memory cells of the memory devices can be grouped as pages that can refer to a logical unit of the memory device used to store data. With some types of memory (e.g., NAND), pages can be grouped to form blocks.

Although non-volatile memory devices such as 3D cross-point type and NAND type memory (e.g., 2D NAND, 3D NAND) are described, the memory device can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), spin transfer torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller (or controller for simplicity) can communicate with the memory devices to perform operations such as reading data, writing data, or erasing data at the memory devices and other such operations (e.g., in response to commands scheduled on a command bus by controller). The controller can include hardware such as one or more integrated circuits (ICs), discrete components, or a buffer memory, or a combination thereof. The hardware can include digital circuitry with dedicated (i.e., hard-coded) logic to perform the operations described herein. The controller can be a microcontroller, special-purpose logic circuitry (e.g., a field programmable gate array (FPGA), an application specific integrated circuit (ASIC), etc.), or another suitable processor.

The controller can include a processing device (processor) configured to execute instructions stored in a local memory. In the illustrated example, the local memory of the controller includes an embedded memory configured to store instructions for performing various processes, operations, logic flows, and routines that control operation of the memory sub-system, including handling communications between the memory sub-system and the host system.

In some embodiments, the local memory can include memory registers storing memory pointers, fetched data, etc. The local memory can also include read-only memory (ROM) for storing micro-code. While the example memory sub-system includes a controller, in another embodiment of the present disclosure, a memory sub-system does not include a controller, and can instead rely upon external control (e.g., provided by an external host, or by a processor or controller separate from the memory sub-system).

In general, the controller can receive commands or operations from the host system and can convert the commands or operations into instructions or appropriate commands to achieve the desired access to the memory devices. The controller can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices. The controller can further include host interface circuitry to communicate with the host system via the physical host interface. The host interface circuitry can convert the commands received from the host system into command instructions to access the memory devices as well as convert responses associated with the memory devices into information for the host system.

The memory sub-system can also include additional circuitry or components that are not illustrated. In some embodiments, the memory sub-system can include a cache or buffer (e.g., DRAM) and address circuitry (e.g., a row decoder and a column decoder) that can receive an address from the controller and decode the address to access the memory devices.

In some embodiments, the memory devices include local media controllers that operate in conjunction with memory sub-system controller to execute operations on one or more memory cells of the memory devices. An external controller (e.g., memory sub-system controller) can externally manage the memory device (e.g., perform media management operations on the memory device). In some embodiments, a memory device is a managed memory device, which is a raw memory device combined with a local media controller for media management within the same memory device package. An example of a managed memory device is a managed NAND (MNAND) device.

The controller or a memory device can include a storage manager configured to implement storage functions discussed above. In some embodiments, the controller in the memory sub-system includes at least a portion of the storage manager. In other embodiments, or in combination, the controller or the processing device in the host system includes at least a portion of the storage manager. For example, the controller, the controller, or the processing device can include logic circuitry implementing the storage manager. For example, the controller, or the processing device (processor) of the host system, can be configured to execute instructions stored in memory for performing the operations of the storage manager described herein. In some embodiments, the storage manager is implemented in an integrated circuit chip disposed in the memory sub-system. In other embodiments, the storage manager can be part of the firmware of the memory sub-system, an operating system of the host system, a device driver, or an application, or any combination therein.

In one embodiment, an example machine of a computer system within which a set of instructions, for causing the machine to perform any one or more of the methods discussed herein, can be executed. In some embodiments, the computer system can correspond to a host system that includes, is coupled to, or utilizes a memory sub-system or can be used to perform the operations described above. In alternative embodiments, the machine can be connected (e.g., networked) to other machines in a LAN, an intranet, an extranet, or the internet, or any combination thereof. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a personal digital assistant (PDA), a cellular telephone, a web appliance, a server, a network router, a switch or bridge, a network-attached storage facility, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system includes a processing device, a main memory (e.g., read-only memory (ROM), flash memory, dynamic random access memory (DRAM) such as synchronous DRAM (SDRAM) or Rambus DRAM (RDRAM), static random access memory (SRAM), etc.), and a data storage system, which communicate with each other via a bus (which can include multiple buses).

A processing device can be one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. A processing device can also be one or more special-purpose processing devices such as an application specific integrated circuit (ASIC), a field programmable gate array (FPGA), a digital signal processor (DSP), network processor, or the like. The processing device is configured to execute instructions for performing the operations and steps discussed herein. The computer system can further include a network interface device to communicate over the network.

The data storage system can include a machine-readable medium (also known as a computer-readable medium) on which is stored one or more sets of instructions or software embodying any one or more of the methodologies or functions described herein. The instructions can also reside, completely or at least partially, within the main memory and within the processing device during execution thereof by the computer system, the main memory and the processing device also constituting machine-readable storage media. The machine-readable medium, data storage system, or main memory can correspond to the memory sub-system.

In one embodiment, the instructions include instructions to implement functionality corresponding to the operations described above. While the machine-readable medium is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to convey the substance of their work most effectively to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

In one embodiment, a memory device includes a controller that controls voltage drivers (e.g., 205, 215, 225 of FIG. 3) and/or other components of the memory device. The controller is instructed by firmware or other software. The software can be stored on a machine-readable medium as instructions, which can be used to program the controller. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In this description, various functions and operations may be described as being performed by or caused by computer instructions to simplify description. However, those skilled in the art will recognize what is meant by such expressions is that the functions result from execution of the computer instructions by one or more controllers or processors, such as a microprocessor. Alternatively, or in combination, the functions and operations can be implemented using special-purpose circuitry, with or without software instructions, such as using application-specific integrated circuit (ASIC) or field-programmable gate array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. An apparatus comprising:
a memory cell array comprising memory cells, wherein each memory cell is programmable to store a respective bit for a multi-bit weight, and each memory cell has a position in the array corresponding to a significance of its stored respective bit;
voltage drivers configured to apply respective voltages to the memory cells, wherein each respective voltage represents a one-bit input, and wherein the voltages are applied so that the memory cells do not threshold;
a first line coupled to first memory cells storing a respective bit of a first significance, wherein the first line is configured to sum first output currents from each of the first memory cells;
a second line coupled to second memory cells storing a respective bit of a second significance, wherein the second significance is less than the first significance, and the second line is configured to sum second output currents from each of the second memory cells; and
a logic circuit configured to provide an accumulation result based on the summed first output currents and the summed second output currents.

2. The apparatus of claim 1, wherein each memory cell is programmable to vary a conductance or resistance of the memory cell, and an extent of the output current from the memory cell corresponds to the conductance or resistance.

3. The apparatus of claim 1, wherein the memory cells are organized in horizontal tiers of cells, the tiers are stacked vertically above a semiconductor substrate, and first memory cells in a first tier are selected and coupled to the line for performing the multiplication.

4. The apparatus of claim 3, wherein the memory cells are resistive random access memory (RRAM) cells with a local selector, RRAM cells without a local selector, NAND flash memory cells, or NOR flash memory cells.

5. The apparatus of claim 3, wherein the memory cells are programmable by varying charge stored in a floating gate or a charge trap of each memory cell.

6. The apparatus of claim 3, wherein the memory cells are programmable by varying a resistance of each memory cell.

7. The apparatus of claim 1, further comprising:
at least one digitizer configured to provide a first result based on the summed first output currents, and provide a second result based on the summed second output currents;
at least one shifter configured to at least shift the first result; and
at least one adder configured to provide the accumulation result by at least adding the shifted first result to the second result.

8. The apparatus of claim 7, wherein the first result is left shifted by one bit.

9. The apparatus of claim 1, wherein the accumulation result is from multiplication of a column of multi-bit weights by a column of input bits.

10. The apparatus of claim 1, wherein the memory cells are phase-change memory cells, NAND flash memory cells, or NOR flash memory cells.

11. An apparatus comprising:
a memory cell array comprising memory cells, wherein each memory cell is programmable to store a respective bit for a multi-bit weight, and each memory cell has a position in the array corresponding to a significance of its stored respective bit; and
a multiplier-accumulator unit configured to perform a multiplication of the multi-bit weight by a multi-bit input and provide an accumulation result, wherein:
the memory cells are kept in a sub-threshold mode during the multiplication;
each bit of the multi-bit input is applied to the multiplier-accumulator unit at a respective time instance to obtain a respective result, wherein the respective result is based on summing output currents from the memory cells; and
the accumulation result is based on the respective results obtained from applying the bits of the multi-bit input.

12. The apparatus of claim 11, wherein summing the output currents comprises summing currents on lines for columns of memory cells in the memory cell array to provide column results for the applied bit.

13. The apparatus of claim 12, wherein the multiplier-accumulator unit comprises shifters and adders configured to combine the column results to provide the respective result for each applied bit.

14. The apparatus of claim 11, wherein:
each respective result is shifted left according to a position of the applied bit of the multi-bit input to provide shifted results; and
the shifted results are added to provide the accumulation result.

15. An apparatus comprising:
a memory cell array comprising memory cells, wherein each memory cell is programmable to store a respective bit for a multi-bit weight, and each memory cell has a position in the array corresponding to a significance of its stored respective bit;
voltage drivers configured to apply voltage pulses to the memory cells, wherein a respective width of each pulse represents a multi-bit input;
a first line coupled to first memory cells storing a bit of a first significance, wherein the first line is configured to collect first output currents from each of the first memory cells for accumulating a first charge;
a second line coupled to second memory cells storing a bit of a second significance, wherein the second significance is less than the first significance, and the second line is configured to collect second output currents from each of the second memory cells for accumulating a second charge; and
a logic circuit configured to output a result based on the accumulated first charge and the accumulated second charge.

16. The apparatus of claim 15, wherein the memory cells are kept in a sub-threshold mode while the voltage pulses are applied.

17. The apparatus of claim 15, further comprising a first capacitor coupled to the first line to accumulate the first charge, and a second capacitor coupled to the second line to accumulate the second charge.

18. The apparatus of claim 15, further comprising at least one digitizer to provide a first result based on the accumulated first charge, and a second result based on the accumulated second charge, wherein the result from the logic circuit is determined at least based on shifting the first result and adding the shifted first result to the second result.

19. The apparatus of claim 15, wherein each voltage pulse has a same constant voltage.

20. The apparatus of claim 15, further comprising at least one integrator to provide a first result based on the accumulated first charge and a second result based on the accumulated second charge, wherein the result from the logic circuit is based on the first and second results.

* * * * *